US012014136B2

(12) United States Patent
Sanders et al.

(10) Patent No.: US 12,014,136 B2
(45) Date of Patent: *Jun. 18, 2024

(54) SYSTEMS AND METHODS FOR TRANSLATION COMMENTS FLOWBACK

(71) Applicant: WORKIVA INC., Ames, IA (US)

(72) Inventors: Theisen Sanders, Ames, IA (US); Hannah Deering, Colorado Springs, CO (US)

(73) Assignee: WORKIVA INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,723

(22) Filed: Mar. 29, 2023

(65) Prior Publication Data

US 2023/0229853 A1  Jul. 20, 2023

Related U.S. Application Data

(63) Continuation of application No. 17/502,360, filed on Oct. 15, 2021, now Pat. No. 11,640,495.

(51) Int. Cl.
*G06F 40/169* (2020.01)

(52) U.S. Cl.
CPC .................. *G06F 40/169* (2020.01)

(58) Field of Classification Search
CPC ..................................... G06F 40/169
See application file for complete search history.

(56) References Cited

U.S. PATENT DOCUMENTS

| 4,807,182 A | 2/1989 | Queen |
| 5,603,021 A | 2/1997 | Spencer et al. |
| 5,729,730 A | 3/1998 | Wlaschin et al. |
| 5,758,356 A | 5/1998 | Hara et al. |
| 5,883,623 A | 3/1999 | Cseri |
| 6,057,837 A | 5/2000 | Hatakeda et al. |
| 6,138,130 A | 10/2000 | Adler et al. |
| 6,230,173 B1 | 5/2001 | Ferrel et al. |

(Continued)

FOREIGN PATENT DOCUMENTS

WO   2008/107665 A2   9/2008

OTHER PUBLICATIONS

Bewig, "How do you know your spreadsheet is right? Principles, Techniques and Practice of Spreadsheet Style," <http://www.eusprig.org/hdykysir.pdf>, Jul. 28, 2005, 14 pages.

(Continued)

*Primary Examiner* — Kyle R Stork
(74) *Attorney, Agent, or Firm* — Faegre Drinker Biddle & Reath LLP

(57) ABSTRACT

Disclosed are systems and methods for translation comments flowback. In some embodiments, the method includes the steps of: obtaining a first document associated with a primary document, the primary document in a primary language, the first document comprising one or more translated sections in a first language, the one or more translated sections being mapped to one or more sections in the primary document via a content identifier, the first language being different from the primary language; transmitting the first document to a first user for review; receiving a first input associated with the one or more translated sections in the first document from the first user; and populating the first input to the primary document based on the content identifier.

24 Claims, 15 Drawing Sheets

(56) References Cited

U.S. PATENT DOCUMENTS

| | | |
|---|---|---|
| 6,252,605 B1 | 6/2001 | Beesley et al. |
| 6,460,059 B1 | 10/2002 | Wisniewski |
| 6,572,660 B1 | 6/2003 | Okamoto |
| 6,631,385 B2 | 10/2003 | Lee et al. |
| 6,741,998 B2 | 5/2004 | Ruth et al. |
| 6,792,454 B2 | 9/2004 | Nakano et al. |
| 6,848,077 B1 | 1/2005 | McBrearty et al. |
| 6,909,965 B1 | 6/2005 | Beesley et al. |
| 6,948,154 B1 | 9/2005 | Rothermel et al. |
| 7,080,065 B1 | 7/2006 | Kothuri et al. |
| 7,096,422 B2 | 8/2006 | Rothschiller et al. |
| 7,124,362 B2 | 10/2006 | Tischer |
| 7,181,467 B2 | 2/2007 | Kothuri |
| 7,219,108 B2 | 5/2007 | Kothuri et al. |
| 7,249,314 B2 | 7/2007 | Walker et al. |
| 7,424,671 B2 | 9/2008 | Elza et al. |
| 7,496,837 B1 | 2/2009 | Larcheveque et al. |
| 7,496,841 B2 | 2/2009 | Hadfield et al. |
| 7,587,471 B2 | 9/2009 | Yasuda et al. |
| 7,631,255 B2 | 12/2009 | Weise et al. |
| 7,734,714 B2 | 6/2010 | Rogers |
| 7,761,403 B2 | 7/2010 | Witkowski et al. |
| 7,792,847 B2 | 9/2010 | Dickerman et al. |
| 7,809,712 B2 | 10/2010 | Witkowski et al. |
| 7,827,208 B2 | 11/2010 | Bosworth et al. |
| 7,984,371 B2 | 7/2011 | Zdenek |
| 8,015,235 B1 | 9/2011 | Bauer et al. |
| 8,108,464 B1 | 1/2012 | Rochelle et al. |
| 8,307,337 B2 | 11/2012 | Chamieh et al. |
| 8,332,747 B2 | 12/2012 | Carro et al. |
| 8,335,783 B2 | 12/2012 | Milby |
| 8,412,813 B2 | 4/2013 | Carlson et al. |
| 8,423,471 B1 | 4/2013 | Emigh et al. |
| 8,527,865 B2 | 9/2013 | Li et al. |
| 8,555,161 B2 | 10/2013 | Parker |
| 8,595,620 B2 | 11/2013 | Larsen et al. |
| 8,595,750 B2 | 11/2013 | Agarwal et al. |
| 8,607,207 B2 | 12/2013 | Chamieh et al. |
| 8,645,929 B2 | 2/2014 | Chamieh et al. |
| 8,656,290 B1 | 2/2014 | Greenspan et al. |
| 8,707,156 B2 | 4/2014 | Xue et al. |
| 8,745,483 B2 | 6/2014 | Chavoustie et al. |
| 8,825,594 B2 | 9/2014 | Skaria et al. |
| 8,849,834 B2 | 9/2014 | Milby |
| 8,856,234 B2 | 10/2014 | Kluin et al. |
| 8,869,020 B2 | 10/2014 | Daga |
| 8,954,457 B2 | 2/2015 | Fablet et al. |
| 9,015,301 B2 | 4/2015 | Redlich et al. |
| 9,152,686 B2 | 10/2015 | Whitehead et al. |
| 9,251,235 B1 | 2/2016 | Hurst et al. |
| 9,292,366 B2 | 3/2016 | Carro et al. |
| 9,292,482 B1 | 3/2016 | Thiesen et al. |
| 9,292,507 B2 | 3/2016 | Calkowski et al. |
| 9,552,343 B2 | 1/2017 | Thiesen et al. |
| 9,613,055 B2 | 4/2017 | Tyercha et al. |
| 9,720,931 B2 | 8/2017 | Tyercha et al. |
| 10,133,708 B2 | 11/2018 | Carro et al. |
| 10,140,269 B2 | 11/2018 | Vogel et al. |
| 10,147,054 B2 | 12/2018 | Dayon et al. |
| 10,223,340 B2 | 3/2019 | Soni |
| 10,325,014 B2 | 6/2019 | Nelson et al. |
| 10,331,776 B2 | 6/2019 | Thiesen et al. |
| 10,635,744 B2 | 4/2020 | Beth et al. |
| 10,878,182 B2 | 12/2020 | Thiesen et al. |
| 10,902,185 B1 | 1/2021 | Cairns |
| 10,936,808 B2 | 3/2021 | Soni |
| 10,956,446 B1 | 3/2021 | Hurst et al. |
| 11,048,885 B2 | 6/2021 | Liu et al. |
| 11,640,495 B1 * | 5/2023 | Sanders .......... G06F 40/58 715/230 |
| 2002/0049697 A1 | 4/2002 | Nakano et al. |
| 2002/0065848 A1 | 5/2002 | Walker et al. |
| 2002/0103825 A1 | 8/2002 | Bauchot |
| 2003/0028545 A1 | 2/2003 | Wang et al. |
| 2003/0079157 A1 | 4/2003 | Lee et al. |
| 2003/0112273 A1 | 6/2003 | Hadfield et al. |
| 2003/0121008 A1 | 6/2003 | Tischer |
| 2003/0128243 A1 | 7/2003 | Okamoto et al. |
| 2004/0024752 A1 | 2/2004 | Manber et al. |
| 2004/0133567 A1 | 7/2004 | Witkowski et al. |
| 2004/0172616 A1 | 9/2004 | Rothschiller et al. |
| 2004/0181543 A1 | 9/2004 | Wu et al. |
| 2004/0193615 A1 | 9/2004 | Kothuri |
| 2005/0132070 A1 | 6/2005 | Redlich et al. |
| 2005/0149851 A1 | 7/2005 | Mittal |
| 2006/0044307 A1 | 3/2006 | Song |
| 2006/0080594 A1 | 4/2006 | Chavoustie et al. |
| 2006/0085386 A1 | 4/2006 | Thanu et al. |
| 2006/0101324 A1 | 5/2006 | Goldberg et al. |
| 2006/0143607 A1 | 6/2006 | Morris |
| 2006/0224946 A1 | 10/2006 | Barrett et al. |
| 2006/0271868 A1 | 11/2006 | Sullivan et al. |
| 2007/0033519 A1 | 2/2007 | Zdenek |
| 2007/0055989 A1 | 3/2007 | Shanks et al. |
| 2007/0124281 A1 | 5/2007 | Cowan |
| 2007/0136698 A1 | 6/2007 | Trujillo et al. |
| 2007/0186157 A1 | 8/2007 | Walker et al. |
| 2007/0219956 A1 | 9/2007 | Milton |
| 2007/0220415 A1 | 9/2007 | Cheng et al. |
| 2007/0245409 A1 | 10/2007 | Harris et al. |
| 2008/0005164 A1 | 1/2008 | Yee et al. |
| 2008/0114720 A1 | 5/2008 | Smith et al. |
| 2008/0134138 A1 | 6/2008 | Chamieh et al. |
| 2008/0148140 A1 | 6/2008 | Nakano |
| 2008/0162532 A1 | 7/2008 | Daga |
| 2008/0177825 A1 | 7/2008 | Dubinko et al. |
| 2008/0300864 A1 | 12/2008 | Smith |
| 2008/0306983 A1 | 12/2008 | Singh |
| 2009/0044283 A1 | 2/2009 | Yoshihama |
| 2009/0063949 A1 | 3/2009 | Duan |
| 2009/0094242 A1 | 4/2009 | Lo et al. |
| 2009/0100324 A1 | 4/2009 | Aureglia et al. |
| 2009/0150426 A1 | 6/2009 | Cannon et al. |
| 2009/0182763 A1 | 7/2009 | Hawking |
| 2009/0182837 A1 | 7/2009 | Rogers |
| 2009/0199090 A1 | 8/2009 | Poston et al. |
| 2009/0292730 A1 | 11/2009 | Li et al. |
| 2009/0327213 A1 | 12/2009 | Choudhary |
| 2010/0058176 A1 | 3/2010 | Carro et al. |
| 2010/0077331 A1 | 3/2010 | Bargh et al. |
| 2010/0257439 A1 | 10/2010 | Xue et al. |
| 2011/0106795 A1 | 5/2011 | Maim |
| 2011/0202968 A1 | 8/2011 | Nurmi |
| 2011/0271179 A1 | 11/2011 | Jasko et al. |
| 2012/0030563 A1 | 2/2012 | Lemonik et al. |
| 2012/0136874 A1 | 5/2012 | Milby |
| 2012/0137308 A1 | 5/2012 | Agarwal et al. |
| 2012/0151312 A1 | 6/2012 | Clee et al. |
| 2012/0173612 A1 | 7/2012 | Vegesna-Venkata et al. |
| 2012/0330984 A1 | 12/2012 | Fablet et al. |
| 2012/0331379 A1 | 12/2012 | Carro et al. |
| 2013/0232475 A1 | 9/2013 | Chamieh et al. |
| 2014/0047327 A1 | 2/2014 | Larsen et al. |
| 2014/0082470 A1 | 3/2014 | Trebas et al. |
| 2014/0129645 A1 | 5/2014 | Mo |
| 2014/0181016 A1 | 6/2014 | Whitehead et al. |
| 2014/0188544 A1 | 7/2014 | Senescu |
| 2014/0245257 A1 | 8/2014 | Kusmer et al. |
| 2014/0281870 A1 | 9/2014 | Vogel et al. |
| 2014/0282101 A1 | 9/2014 | Beechuk et al. |
| 2015/0052100 A1 | 2/2015 | Calkowski et al. |
| 2015/0058449 A1 | 2/2015 | Garg et al. |
| 2015/0100304 A1 | 4/2015 | Tealdi et al. |
| 2015/0100594 A1 | 4/2015 | Hess et al. |
| 2015/0199270 A1 | 7/2015 | Day-Richter et al. |
| 2015/0324373 A1 | 11/2015 | Tyercha et al. |
| 2015/0324399 A1 | 11/2015 | Tyercha et al. |
| 2016/0041963 A1 | 2/2016 | Coblenz et al. |
| 2016/0162128 A1 | 6/2016 | Hansen et al. |
| 2016/0162461 A1 | 6/2016 | Simon et al. |
| 2016/0239488 A1 | 8/2016 | Aguilon et al. |
| 2016/0344667 A1 | 11/2016 | Lane et al. |
| 2016/0378737 A1 | 12/2016 | Keslin et al. |
| 2017/0132188 A1 | 5/2017 | Thiesen et al. |

(56) References Cited

U.S. PATENT DOCUMENTS

| | | |
|---|---|---|
| 2017/0220546 A1 | 8/2017 | Codrington et al. |
| 2017/0308511 A1 | 10/2017 | Beth et al. |
| 2018/0165260 A1 | 6/2018 | Soni |
| 2019/0102370 A1 | 4/2019 | Nelson et al. |
| 2020/0250383 A1 | 8/2020 | Cheng |
| 2021/0064817 A1 | 3/2021 | Deering et al. |
| 2021/0081605 A1 | 3/2021 | Smith et al. |

OTHER PUBLICATIONS

Burnett et al., "Testing Homogeneous Spreadsheet Grids with the "What You See Is What You Test" Methodology," IEEE Transactions on Software Engineering, Jun. 2002, vol. 28, No. 6, pp. 576-594.

ExtendOffice, "How to insert multiple hyperlinks in a cell in Excel?", ExtendOffice.com, <https://web.archive.org/web/20150409040726/https://www.extendoffice.com/documents/excel/916-excel-insert-mulitple-hyperlinks.html>, 2015, 3 pages.

Grishchenko, "Deep Hypertext with Embedded Revision Control Implemented in regular Expressions," Proceedings of the 6th International Symposium on Wikis and Open Collaboration, ACM, 2010, 10 pages.

Grishchenko et al., "Referencing within evolving hypertext," Second international Workshop on Dynamic and Adaptive Hypertext, 2011, 12 pages.

Guttman, "R-Trees: A Dynamic Index Structure for Spatial Searching," ACM, 1984, pp. 47-57.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

Kamel et al., "Hilbert R-tree: An Improved R-tree Using Fractals," PVLDB '94 Proceedings of the 20th International Conference on Very Large Data Bases, Sep. 12-15, 1994, Morgan Kaufman Publishers Inc., San Francisco, CA, USA, 1994, pp. 500-509.

Kankuzi, "A Dynamic Graph-based Visualization for Spreadsheets," University of Bostwana, Faculty of Science, Department of Computer Science, <http://www.researchgate.net/profile/Yirsaw_Ayalew2/publication/234808991_A_dynamic_graph-based_visualization_for_spreadsheets/links/00b7d51a9b5169d566000000. pdf>, Jun. 2008, 121 pages.

Kankuzi et al., "An End-User Oriented Graph-Based Visualization for Spreadsheets," Proceedings of the 4th International Workshop on End-user Software Engineering, WEUSE '08, May 12, 2008, Leipzig, Germany, ACM, 2008, pp. 86-90.

Microsoft, "Create an external reference (link) to a cell range in another workbook," Excel for Microsoft 365, Excel 2019, Excel 2016, Excel 2013, Excel 2010 Support Office, 2020, retrieved from internet at <https://support.office.com/en-us/article/create-an-external-reference-link-to-a-cell-range-in-another-workbook-c98d1803-dd75-4668-ac6a-d7cca2a9b95f> on May 5, 2020, 8 pages.

Microsoft, "Create or change a cell reference," Excel for Microsoft 365, Excel for the web, Excel 2019, Excel 2016 Support Office, 2020, retrieved from internet at <https://support.office.com/en-us/article/create-or-change-a-cell-reference-c7b8b95d-c594-4488-947e-c835903cebaa> on May 5, 2020, 8 pages.

Rothermel et al., "A Methodology for Testing Spreadsheets," ACM Transactions on Software Engineering and Methodology, Jan. 2001, vol. 10, No. 1, pp. 110-147.

Sewall et al., "PALM: Parallel Architecture-Friendly Latch-Free Modifications to B+ Trees on Many-Core Processors," Proc. VLDB Endowment, 2011, pp. 795-806.

Stanescu et al., "Using R-trees in content-based region query with spatial bounds," Seventh International Symposium on Symbolic and Numeric Algorithms for Scientific Computing (SYNASC'05), Timisoara, Romania, 2005, 7 pages.

Tang et al., "Novel DR-tree index based on the diagonal line of MBR," 2012 8th International Wireless Communications and Mobile Computing Conference (IWCMC), Limassol, Cyprus, 2012, pp. 574-579.

Yang et al., "Performance of R-Tree with Slim-Down and Reinsertion Algorithm," 2010 International Conference on Signal Acquisition and Processing, Bangalore, India, 2010, pp. 291-294.

\* cited by examiner

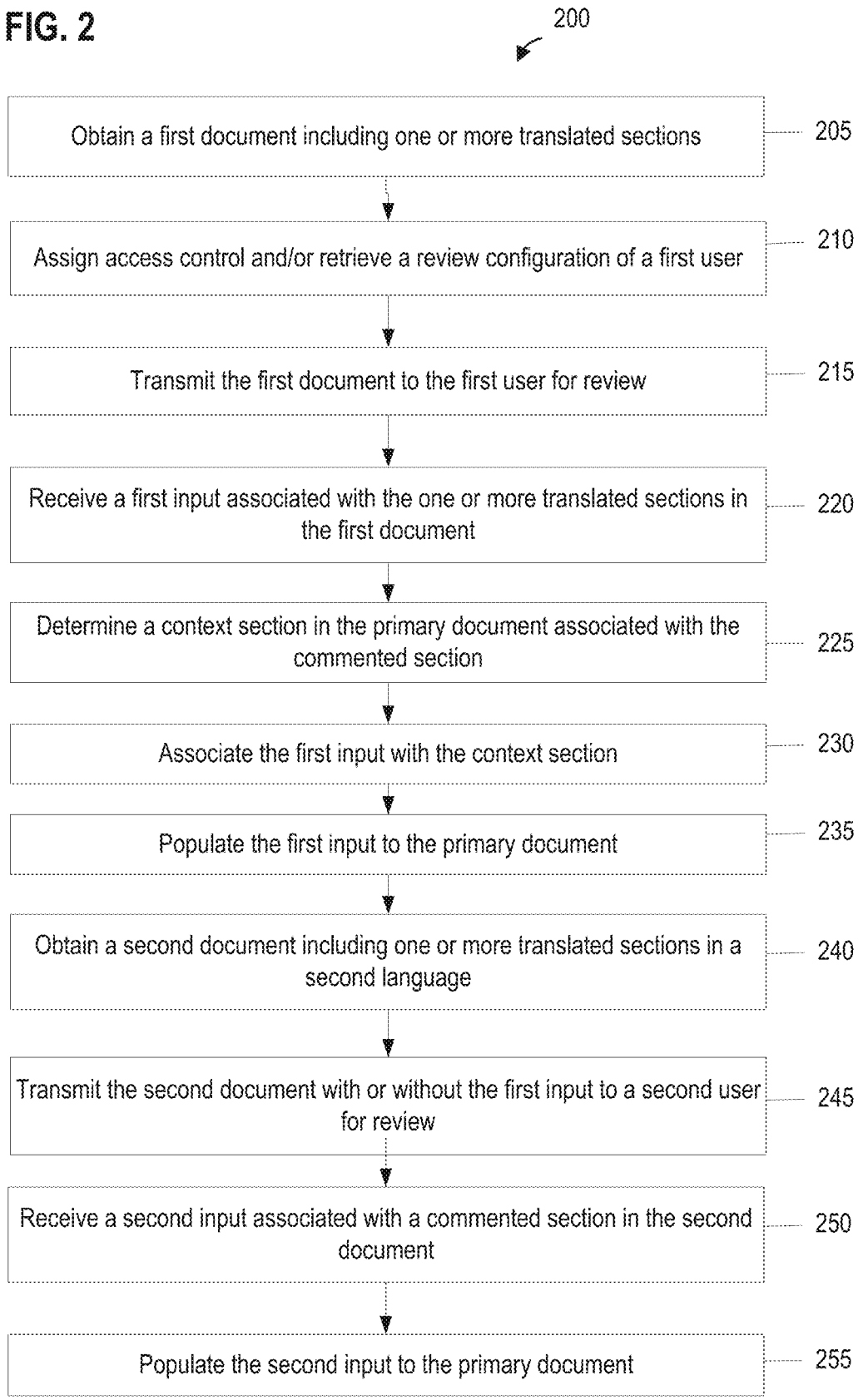

SYSTEMS AND METHODS FOR TRANSLATION COMMENTS FLOWBACK

CROSS-REFERENCE TO RELATED APPLICATIONS

This application is a continuation of U.S. patent application Ser. No. 17/502,360, filed on Oct. 15, 2021, now U.S. Pat. No. 11,640,495, the disclosure of which is hereby incorporated by reference in its entirety.

TECHNICAL FIELD

The present disclosure relates generally to electronic document management and, more particularly, to a data storage and retrieval system and method for maintaining links, revisions, translations, reviews, comments, and other information in a plurality of documents.

BACKGROUND

Keeping track of different types of data entries and interdependencies among the different entries is a task for which computers are ideally suited, and modern society depends heavily on this capability. From social networking platforms to financial analysis applications, computers, along with robust communication networks, are able to propagate a change or a comment in one data item (e.g., a change in a cell of a spreadsheet, a comment on a statement or a number in a document) to other data items (e.g., a recalculation of a formula in a spreadsheet, an update of an emoticon on the devices of the user's friends).

One problem that arises with propagating changes and comments among many interdependent data entries is that it can be very slow when the number of entries and interdependencies is high and when the entries are stored across different documents, databases, servers and different geographical locations of computing devices. For example, those who work with large spreadsheets are familiar with the experience in which, when a change is made to one cell of a spreadsheet, the spreadsheet program spends a long time updating itself repeatedly as the formulas depending on the changed cell get recalculated, the formulas depending on those formulas get recalculated, and so on. Dependencies that cross documents or servers create similar delays.

SUMMARY

At least some aspects of the present disclosure are directed to a method implemented by one or more processors. The method includes the steps of: obtaining a first document associated with a primary document, the primary document in a primary language, the first document comprising one or more translated sections in a first language, the one or more translated sections being mapped to one or more sections in the primary document via a content identifier, the first language being different from the primary language; transmitting the first document to a first user for review; receiving a first input associated with the one or more translated sections in the first document from the first user; and populating the first input to the primary document based on the content identifier.

At least some aspects of the present disclosure are directed to a system comprising: one or more memories storing instructions thereon; and one or more processors configured to execute the instructions to perform the operations comprising: obtaining a first document associated with a primary document, the primary document in a primary language, the first document comprising one or more translated sections in a first language, the one or more translated sections being mapped to one or more sections in the primary document via a content identifier, the first language being different from the primary language; transmitting the first document to a first user for review; receiving a first input associated with the one or more translated sections in the first document from the first user; and populating the first input to the primary document based on the content identifier.

BRIEF DESCRIPTION OF THE DRAWINGS

The accompanying drawings are incorporated in and constitute a part of this specification and, together with the description, explain the features and principles of the disclosed embodiments. In the drawings.

FIG. 2 is a flowchart illustrating one example of a method for translation comments flowback, in accordance with certain embodiments of the present disclosure;

FIGS. 3A-3H are example user interfaces of a system for translation comment flowback, in accordance with certain embodiments of the present disclosure;

DETAILED DESCRIPTION

Figure 1:
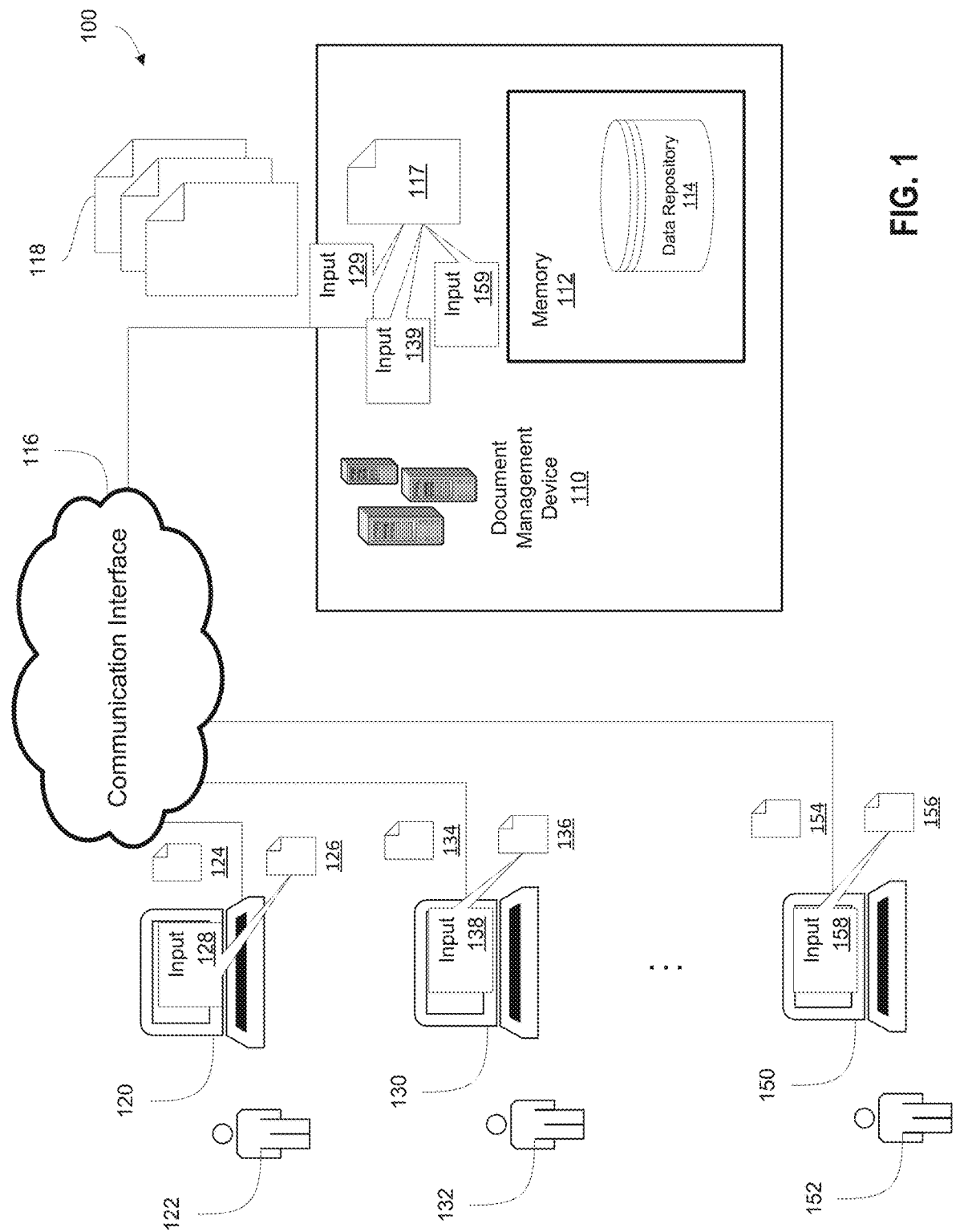
FIG. 1 depicts an illustrative system diagram of a document management system, in accordance with certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

In some embodiments, a document revision or a series of document revisions can be generated with inputs by a reviewer. In some embodiments, a reviewer can provide inputs such as, comments, edits, edits with mark-ups, translations and/or other document review or revision actions to a document or a section of the document. As used herein, a document generated as a result of a reviewer's review and/or revision actions is referred to as a secondary document. In some examples, the document to be reviewed is a mainline document, which is a master copy of a set of related documents. The mainline document and the secondary documents are collectively a set of related documents. A document section refers to one or more sections within a document. In some examples, the document is a blackline document, or referred to as a comparison document, which is a revision to a document showing mark-ups of changes (e.g., additions, modifications, and deletions). A blackline document is a type of a secondary document. In certain examples, a secondary document may be a review document which includes comments to a document (e.g., a mainline document, a secondary document) or a document section. In some examples, a secondary document is a comparison review document that includes comments and/or revisions to a blackline document. In certain examples, a secondary document is a translation document that includes translations of a document (e.g., a mainline document, a secondary document) or a document section.

In systems configured to maintain multiple documents with various dependencies on each other, and particularly those with dozens of documents of various languages, comments provided by one or more reviewers and relevant sections of the documents can be important yet time-consuming to track and manage. In some examples, the multiple related documents include a mainline document in the original language (e.g., English) and one or more translated documents each including a part of or all the mainline document being translated to a language (e.g., French, Chinese) different from the original language. In certain examples, translated documents associated with the mainline document in various languages are sent for review by reviewers. At least some embodiments of the present disclose are directed to systems and methods for populating comments, made to translated documents by reviewers, to the mainline document and/or associating the comments to relevant sections in the mainline document.

FIG. 1 depicts an illustrative system diagram of document management system 100, in accordance with certain embodiments of the present disclosure. As illustrated, the system 100 includes a document management device 110, communication interface 116, and one or more computing devices (120, 130, 150). In some implementations, one or more components of the document management system 100 are optional. In certain implementations, the document management system 100 can include additional components. In some cases, the document management system 100 interfaces with one or more other systems (not shown), for example, a filing system, a finance system, a vendor system, and/or the like.

In some embodiments, the document management device 110 includes one or more processors (e.g., microprocessors, servers, central processing units (CPUs), etc.) and one or more memories 112. The one or more memories 112 includes the data repository 114 to store documents, comments, mark-ups, reviews, and other information related documents. As used herein, a document includes a text document, a graphics-based document, a spreadsheet, or a hybrid of one or more of the foregoing. A document includes one or more document sections. A document section includes one or more section fragments. The document management device 110 is configured to send out documents 118 for review via the communication interface 116. In some variations, the documents 118 include one or more translated documents in various languages (e.g., English, Chinese, Spanish, French, etc.).

In certain embodiments, the document management device 110 is configured to obtain (e.g., receive from a software interface, receive from a network connection, retrieve from a data repository) document(s) 118, where the document(s) 118 are associated with a primary document 117 (e.g., a mainline document, a secondary document) in a primary language. In some examples, the document management device 110 is configured to send documents 118 to the computing devices 120, 130, and 150, and more computing devices. The computing devices 120, 130, and 150 are associated with reviewers 122, 132, and 152 respectively. In some examples, the computing devices 120, 130, and 150 each runs a software application for reviewing. In certain examples, the computing devices 120, 130, and 150 are configured to access web applications to conduct document reviews. In some examples, the computing devices 120, 130, and 150 each runs a mobile application for reviewing.

In some examples, the documents 118 are associated with the primary document 117. In certain examples, the documents 118 include documents 124, 134, and 154, each in a respective language different from the primary language. The computing device 120 receives the document 124 in a first language different from the primary language. The document 124 includes one or more sections or all sections of the primary document 117 translated in the first language.

In some embodiments, before transmitting the document 124 for review, an access control to the document 124 is assigned to the user 122, or referred to as the reviewer. The access control may include view-only, editable, selections, annotations, comments, and/or the like. The access control may include access to certain sections in the document 124. In some examples, the user 122 provides input(s) 128 to the document 124, which is incorporated into the document 126. In certain examples, an input 128 is associated with one or more translated sections in the document 124 and includes a content selection and a comment. In some examples, the input 128 is associated with a commented section, which is a part of or all of the one or more translated sections, in the document 124 and includes a content selection and a comment.

In some examples, the document 117 is a text document and the commented section is a text sentence or paragraph. In certain examples, the document 117 is a spreadsheet or includes a table and the commented section is a cell or a plurality of cells in the spreadsheet or in the table. In some examples, the document 117 is a document including graphical content and the commented section is a chart or other graphical content. In certain examples, the content selection includes a plurality of characters in the first language selected from the commented section. In some examples, the content selection is a cell or a plurality of cells. In certain examples, the content selection is graphical content or text associated with the graphical content. In some examples, the content selection is marked with a selection indication such as, for example, a highlight, an underline, a box, a color, other selection indication and/or a combination thereof. In some examples, the comment is in the first language or in the primary language. The document 126 includes the content selection and the comment.

In some examples, the one or more sections of the document 124 is associated with the sections in the primary document 117 via content identifiers such as, for example, document identifiers, section identifiers, links, references, pointers, anchors, tree identifiers, branch identifiers, other metadata, and various combination thereof. As used herein, a link, also referred to as an anchor, is a reference, pointer, or data structure that refers to linked content (or the location of the linked content), while linked content is a set of content, for example, a set of one or more characters or numbers, a set of one or more sentences, a set of one or more paragraphs, a set of one or more cells within a spreadsheet, a set of one or more images, or various combinations thereof. In certain examples, the content identifiers are related to the data structure used to store documents (e.g., tree structures, branch models, etc.).

In some embodiments, the commented section and/or the content selection are associated with one or more content identifiers. In some examples, content identifier includes a document identifier and a section identifier. In certain examples, content identifier includes a document identifier and an anchor. In some examples, content identifier includes a hierarchical data structure including multiple levels of identifiers. For example, content identifier includes one or more document identifiers, one or more section identifiers, one or more cell identifiers, one or more fragment identifiers, and one or more anchors. As an example, a document includes one or more sections, a section includes one or more fragments, and a fragment includes one or more paragraphs. In some examples, a fragment represents a cell in a table or a spreadsheet. In certain examples, a fragment represents a chart or a section represents a chart.

In certain embodiments, the computing device 120 is configured to send the document 126 to the document management device 110 and the document management device 126 is configured to receive the document 126 via the communication interface 116. In some examples, the document management device 110 is configured to identify and select the document 117 associated with the document 124 based on the document identifier and link. In certain examples, the document management device 110 is configured to populate an input 129 corresponding to the input 128 to the document 117. In one example, the input 128 is embedded in the document 126. In some examples, the input 129 may include the content selection information and the comment of the input 128. In some examples, the input In some embodiments, the document management device 110 is configured to select or determine a context section in the primary document 117 associated with the commented section and/or the content selection based on the content identifiers of the respective commented section and/or the content selection.

In certain embodiments, the context section has more content information than the content information of the comment selection. For example, the content selection in the document 124 is a few words in a part of a sentence and the context section in the document 124 is the entire sentence or the paragraph containing the sentence in the document 117. In some embodiments, the context section has more content information than the content information of the comment selection, for example, to reduce word selection errors because of translation, to bypass the needs of recognizing disconnected words in translation, and/or to reduce resource usage for word selections across languages.

In some examples, the context section in the primary document 117 has a character count of a first character number (e.g., 50 characters) and the content selection in the document 124 has a character count of a second character number (e.g., 15 characters), where the first character number is greater than the second character number. In certain examples, the context section in the primary document 117 has a word count of a first word number (e.g., 20 words) and the content selection in the document 124 has a character count of a second word number (e.g., 5 words), where the first word number is greater than the second word number. In some examples, the content selection in the document 124 is associated with at least one anchor (e.g., the anchor associated with a paragraph, the anchor associated with a cell identifier of a cell in a spreadsheet or table), where the context section is determined based on content identifier (e.g., a document identifier, a section identifier, and/or a fragment identifier, etc.) and the at least one anchor. In certain examples, the content selection in the document 124 is associated with two anchors (e.g., the anchors associated with the paragraph, the anchors associated with cell identifiers), wherein the context section is determined based on a section identifier and the two anchors.

In some examples, the anchor includes metadata associated with a paragraph in the document 124, where the paragraph includes the content selection. As an example, the anchor is metadata associated with a first invisible character of the paragraph. In one example, the anchor is metadata associated with a paragraph within a cell in a table or a spreadsheet. As an example, the anchor is metadata associated with a cell identifier of a cell in a table or a spreadsheet. In certain examples, the content selection is associated with a document identifier, a section identifier and an anchor, and the context section is determined based on the document identifier, the section identifier, and the anchor. In some examples, the content selection is associated with a document identifier, a section identifier, a fragment identifier, and an anchor, and the context section is determined based on the document identifier, the section identifier, the fragment identifier, and the anchor.

In certain embodiments, the document management device 110 is configured to obtain (e.g., receive from a software interface, receive from a network connection, retrieve from a data repository) the document 134 in a second language different from the primary language. The document 134 includes one or more sections or all sections of the primary document 117 translated in the second language.

In some embodiments, before transmitting the document 134 for review, an access control to the document 134 is assigned to the user 132. The access control may include view-only (e.g., not editable), editable, selections, annotations, comments, and/or the like. The access control may include access to certain sections in the document 134. In some examples, the user 132 provides input(s) 138 to the document 134, which is incorporated into the document 136. In some examples, an input 138 is associated with a commented section in the document 134 and includes a content selection and a comment. In certain embodiments, a configuration associated with the user 132 is received (e.g., retrieved or obtained) by the document management device 110. In some examples, the configuration includes whether the user 132 is allowed to or prefers to receiving inputs/comments from other users/reviewers, and what inputs/comments is allowed to or preferred to being received.

In certain examples, the document management device 110 is configured to retrieve inputs/comments (e.g., input 128) from other reviewers and incorporate or populate the inputs/comments in the document 134. In some examples, the inputs/comments are populated based on an identifier associated with the first document 124, the second document 134, the primary document 117, and/or document sections.

In some embodiments, the document management device 110 is configured to transmit the document 134 in the second language different from the primary language to the computing device 130. In some examples, the one or more sections of the document 134 is associated with the sections in the primary document via content identifiers. In certain examples, the content identifiers are related to the data structure used to store documents (e.g., tree structures, branch models, etc.). In some embodiments, the commented section and/or the content selection are associated with one or more content identifiers.

In certain embodiments, the computing device 130 is configured to send the document 136 to the document management device 110 and the document management device 136 is configured to receive the document 136 via the communication interface 116. In some examples, the document management device 110 is configured to identify and select the document 117 associated with the document 134 based on the document identifier and link. In certain examples, the document management device 110 is configured to populate an input 139 corresponding to the input 138 to the document 117. In one example, the input 138 is embedded in the document 136. In some examples, the input 139 may include the content selection information and the comment of the input 138. In some embodiments, the document management device 110 is configured to select or determine a context section in the primary document 117 associated with the commented section and/or the content selection based on the content identifiers of the respective commented section and/or the content selection.

In certain embodiments, the context section has more content information than the content information of the comment selection. For example, the content selection in the document 134 is a few words in a part of a sentence and the context section in the document 134 is the entire sentence or the paragraph containing the sentence in the document 117. In some embodiments, the context section has more content information than the content information of the comment selection, for example, to reduce word selection errors because of translation and/or to reduce resource usage for word selections across languages.

In some examples, the context section in the primary document 117 has a character count of a first character number (e.g., 50 characters) and the content selection in the document 134 has a character count of a second character number (e.g., 15 characters), where the first character number is greater than the second character number. In certain examples, the context section in the primary document 117 has a word count of a first word number (e.g., 20 words) and the content selection in the document 134 has a character count of a second word number (e.g., 5 words), where the first word number is greater than the second word number. In some examples, the content selection in the document 134 is associated with at least one anchor (e.g., the anchor associated with the first character), wherein the context section is determined based on a section identifier and the at least one anchor. In certain examples, the content selection in the document 134 is associated with two anchors (e.g., the anchors associated with the first character and last character), wherein the context section is determined based on a section identifier and the two anchors.

In certain embodiments, the document management device 110 is configured to obtain (e.g., receive from a software interface, receive from a network connection, retrieve from a data repository) the document 154 in a third language different from the primary language. The document 154 includes one or more sections or all sections of the primary document 117 translated in the third language.

In some embodiments, before transmitting the document 154 for review, an access control to the document 154 is assigned to the user 152. The access control may include view-only (e.g., not editable), editable, selections, annotations, comments, and/or the like. The access control may include access to certain sections in the document 154. In some examples, the user 152 provides input(s) 158 to the document 154, which is incorporated into the document 156. In some examples, an input 158 is associated with a commented section in the document 154 and includes a content selection and a comment. In certain embodiments, a configuration associated with the user 152 is received (e.g., retrieved or obtained) by the document management device 110. In some examples, the configuration includes whether the user 152 is allowed to or prefers to receiving inputs/comments from other users/reviewers, and what inputs/comments is allowed to or preferred to being received.

In certain examples, the document management device 110 is configured to retrieve inputs/comments (e.g., input 128, input 138) from other reviewers and incorporate or populate the inputs/comments in the document 154. In some examples, the inputs/comments are populated based on an identifier associated with the first document 124, the second document 154, the primary document 117, and/or document sections.

In some embodiments, the document management device 110 is configured to transmit the document 154 in the third language different from the primary language to the computing device 150. In some examples, the one or more sections of the document 154 is associated with the sections in the primary document via content identifiers. In some embodiments, the commented section and/or the content selection are associated with one or more content identifiers.

In certain embodiments, the computing device 150 is configured to send the document 156 to the document management device 110 and the document management device 156 is configured to receive the document 156 via the communication interface 116. In some examples, the document management device 110 is configured to identify and select the document 117 associated with the document 154 based on the document identifier and link. In certain examples, the document management device 110 is configured to populate an input 159 corresponding to the input 158 to the document 117. In one example, the input 158 is embedded in the document 156. In some examples, the input 159 may include the content selection information and the comment of the input 158. In some embodiments, the document management device 110 is configured to select or determine a context section in the primary document 117 associated with the commented section and/or the content selection based on the content identifiers of the respective commented section and/or the content selection.

In certain embodiments, the context section has more content information than the content information of the comment selection. For example, the content selection in the document 154 is a few words in a part of a sentence and the context section in the document 154 is the entire sentence or the paragraph containing the sentence in the document 117. In some embodiments, the context section has more content information than the content information of the comment selection, for example, to reduce word selection errors because of translation and/or to reduce resource usage for word selections across languages.

In some examples, the context section in the primary document 117 has a character count of a first character number (e.g., 50 characters) and the content selection in the document 154 has a character count of a second character number (e.g., 15 characters), where the first character number is different from the second character number. In some instances, the first character number is greater than the second character number. In certain instances, the first character number is smaller than the second character number. In certain examples, the context section in the primary document 117 has a word count of a first word number (e.g., 20 words) and the content selection in the document 154 has a character count of a second word number (e.g., 5 words), where the first word number is different from the second word number. In some instances, the first word number is greater than the second word number. In certain instances, the first word number is smaller than the second word number. In some examples, the content selection in the document 154 is associated with at least one anchor (e.g., an anchor associated with a character, an anchor associated with a cell or a cell identifier), wherein the context section is determined based on a section identifier and the at least one anchor. In certain examples, the content selection in the document 154 is associated with two anchors (e.g., the anchors associated with the first character and last character), wherein the context section is determined based on a section identifier and the two anchors.

In some examples, the anchor includes metadata associated with a paragraph in the document 154, where the paragraph includes the content selection. As an example, the anchor is metadata associated with a first invisible character of the paragraph. In one example, the anchor is metadata associated with a paragraph within a cell in a table. In certain examples, the content selection is associated with a document identifier, a section identifier and an anchor, and the context section is determined based on the document identifier, the section identifier, and the anchor. In some examples, the content selection is associated with a document identifier, a section identifier, a fragment identifier, and an anchor, and the context section is determined based on the document identifier, the section identifier, the fragment identifier, and the anchor.

In various embodiments, at least some documents are stored using a suitable data structure configured to maintain links and references between cells, tables, paragraphs, sections, or other suitable portions of a document. In an embodiment, documents are stored using an RTree (a type of logic tree) data structure. In another embodiment, documents are stored using a causal tree data structure.

In some embodiments, the system includes a computing device that configures the computer memory according to a causal tree (a type of logic tree) representing a structure of a document. The computer memory may be internal to or external to the computing device. Causal tree structures are useful representations of how content and metadata associated with the content are organized. For example, a document may be represented by a single causal tree structure or a bounded set of causal tree structures. The causal tree structure is useful in efficiently tracking and storing changes made in the document. A causal tree structure may include nodes of input instructions (e.g., editing instructions, comment instructions) in the document, and each input instruction has a unique identifier or ID. The input instructions include, for example, text characters, insertion of comments, deletion of comments, insertion of text characters, deletion of text characters, formatting instructions, and other operations. In other words, a causal tree structure is a representation of all the instructions (regardless of type) that compose a document.

In some implementations, the causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID (ID of the instruction), CauseID (ID of the parent instruction), and Value (value of the instruction). Observations have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. Examples of observations are discussed in U.S. patent application Ser. No. 16/871,512.

In an embodiment, the system includes a computing device that configures the computer memory according to an RTree (a type of logic tree) representing a structure of a spreadsheet or other document. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

The one or more memories 112 includes computer-readable media in the form of volatile and/or nonvolatile memory, transitory and/or non-transitory storage media and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In some embodiments, the one or more memories store computer-executable instructions for causing a processor (e.g., the document management device 110, the computing devices 120, 130, and 150) to implement aspects of embodiments of system components discussed herein and/or to perform aspects of embodiments of methods and procedures discussed herein.

Computer-executable instructions may include, for example, computer code, machine-useable instructions, and the like such as, for example, program components capable of being executed by one or more processors associated with a computing device. Program components may be programmed using any number of different programming environments, including various languages, development kits, frameworks, and/or the like. Some or all of the functionality contemplated herein may also, or alternatively, be implemented in hardware and/or firmware.

In some embodiments, the data repository 114 can include documents, comments, reviews, identifiers, links, and/or the like. The data repository 114 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the system 100 can execute software or firmware stored in non-transitory computer-readable medium to implement various processing steps. Various components and processors of the system 100 can be implemented by one or more computing devices, including but not limited to, circuits, a computer, a cloud-based processing unit, a processor, a processing unit, a microprocessor, a mobile computing device, and/or a tablet computer. In some cases, various components of the system 100 (e.g., the document management device 110, the computing devices 120, 130, and 150) can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the document management system 100 can be implemented in software or firmware executed by a computing device.

Various components of the system 100 can communicate via or be coupled to via the communication interface 116, for example, a wired or wireless interface. The communication interface 116 includes, but not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface 116 may be either within a private computer network, such as intranet, or on a public computer network, such as the internet.

In another embodiment, if a first document contains the source element of a link and a second document contains the destination element of the link, then when a user sends a request to edit the source element of the link (e.g., linked content or other properties of the link) in the first document, the request will also trigger a request to edit the destination element of the link in the second document. In other words, when a user makes a revision to the source element of the link in the first document, the revision is propagated to the destination element of the link in the second document. In this instance, the document revision counter of the first document will increment by 1, the document revision counter of the second document will increment by 1, and the workspace level counter will also increment by 1.

Cloud-based document collaboration platforms tend to be fully open and collaborative. That is, all users who are invited to edit a document (e.g., text document, graphics-based document, spreadsheet, or a hybrid of one or more of the foregoing) are able to see one another's edits in real time or nearly real time. However, there are many scenarios in which one or more users would prefer not to share their draft work product with other collaborators. In these scenarios, the user (or group of users) may create a branch of the document, or a branch of a portion thereof (e.g., a section of a document), where read and/or write access to the branch is limited to themselves only (a "private user") or to themselves and any additional users (a "private group"). Once a section becomes private, users other than the private user or those not within the private group will not be able to see additional edits being made but will only see the state of the section as it was just prior to being taken private. The private user or a user within the private group (assuming they have sufficient permission) can choose to make the edits public, which unlocks the private section and allows the rest of the collaborators to view the changes and to make their own edits to the section if desired.

In an embodiment, edits to the document are managed through the use of a causal tree or causal graph, and when a section of the document is taken private, the document collaboration system creates a copy of the relevant segment or segments of the causal tree or causal graph, uses the segment or segments to keep track of the edits and, when the section is subsequently made public, merges the segment or segments into the original causal graph.

In another embodiment, edits to the document are managed through the use of an Rtree (also referred to herein as "R-Tree"), and when a section of the document is taken private, the document collaboration system creates a copy of the relevant segment or segments of the Rtree, uses the segment or segments to keep track of the edits and, when the section is subsequently made public, merges the segment or segments into the original Rtree.

FIG. 2 is a flowchart illustrating one example of a method 200 for translation comments flowback, in accordance with certain embodiments of the present disclosure. Aspects of embodiments of the method 200 are performed, for example, by a computing device (e.g., the computing devices 120, 130, and 150 in FIG. 1, the document management device 110 in FIG. 1). In some implementations, one or more steps of method 200 are optional and/or modified by one or more steps of other embodiments described herein. In some implementations, one or more steps of other embodiments described herein are added to the method 200. In some embodiments, the computing device obtains (e.g., receive from a software interface, receive from a network connection, retrieve from a data repository) a first document including one or more translated sections in a first language (205). The first document is associated with a primary document (e.g., a mainline document, a secondary document) in a primary language different from the first language. The first document, the primary document, and other documents are a set of related document. In some examples, the set of related documents includes a mainline document and one or more secondary document that are generated by review, translation, annotation, comment and revision actions.

In some examples, the primary document is a text document, a graphic-based document, a spreadsheet, and a hybrid document include one or more of the foregoing. In certain examples, the first document includes a portion (e.g., a section, a table, a chart, a paragraph, a chapter, etc.) of the primary document being transactions.

In some embodiments, the computing device is configured to assign an access control to the first user associated with the first document and/or retrieve a review configuration of the first user (210). The access control may include view-only, editable, selections, annotations, comments, and/or the like. The access control may include access to certain sections in the first document. In some examples, the review configuration associated with the first user includes whether the first user is allowed to or prefers to receiving inputs/comments from other users/reviewers, and what inputs/comments is allowed to or preferred to being received. In certain embodiments, the computing device is configured to transmit the first document to the first user (e.g., a computing device associated with the first user, a web page accessed by the first user) for review (215), for example, with an input request.

In some embodiments, the computing device is configured to receive a first input associated with the one or more translated sections in the first document (220), for example provided by the first user via a user device. In certain examples, the first input is associated with a commented section that is a part or all of the one or more translated sections. In some examples, the first input is incorporated into the first document. In certain examples, the first input includes a content selection and a comment. In some examples, the primary document is a text document and the commented section is a text sentence or paragraph. In certain examples, the primary document is a spreadsheet or includes a table and the commented section is a cell or a plurality of cells in the spreadsheet or in the table. In some examples, the primary document is a document including graphical content and the commented section is a chart or other graphical content. In certain examples, the content selection, as selected by the first user, includes one or more characters in the first language selected from the commented section in the first document. In some examples, the content selection is a cell or a plurality of cells. In certain examples, the content selection is graphical content or text associated with the graphical content. In some examples, the content selection is marked with a selection indication such as, for example, a highlight, an underline, a box, a color, other selection indication and/or a combination thereof. In some examples, the comment is in the first language or in the primary language.

In some examples, the one or more sections of the first document is associated with the sections in the primary document via content identifiers such as, for example, document identifiers, section identifiers, links, references, pointers, anchors, tree identifiers, branch identifiers, other metadata, and various combination thereof. In some embodiments, the commented section and/or the content selection are associated with one or more content identifiers. In some examples, the computing device is configured to identify and select the primary document associated with the first document based on the document identifier and/or other identifiers. In some embodiments, the computing device is configured to select or determine a context section in the primary document associated with the commented section (225) and/or the content selection based on the content identifiers of the respective commented section and/or the content selection.

In some embodiments, the computing device is configured to associate the first input with the context section (230). In certain examples, the computing device is configured to populate the first input to the primary document (235). In certain embodiments, the context selection is selected via identifiers associated with the primary document, the first document, the commented section, and/or the content selection. In some examples, the context section has more content information than the content information of the comment selection. For example, the content selection in the first document is a word or a few words in a sentence and the context section in the first document is the entire sentence or the paragraph containing the sentence in the primary document. In some embodiments, the context section has more content information than the content information of the comment selection, for example, to reduce word selection errors because of translation and/or to reduce resource usage for word selections across languages.

In some examples, the context section in the primary document has a character count of a first character number (e.g., 50 characters) and the content selection in the first document has a character count of a second character number (e.g., 15 characters), where the first character number is different from the second character number. In some instances, the first character number is greater than the second character number. In certain instances, the first character number is smaller than the second character number. In certain examples, the context section in the primary document has a word count of a first word number (e.g., 20 words) and the content selection in the first document has a word count of a second word number (e.g., 5 words), where the first word number is different from the second word number. In some instances, the first word number is greater than the second word number. In certain instances, the first word number is smaller than the second word number. In some examples, the content selection in the first document is associated with at least one anchor (e.g., an anchor associated with a first character, an anchor associated with a paragraph, an anchor associated with a cell identifier), wherein the context section is determined based on a section identifier and the at least one anchor. In certain examples, the content selection in the first document is associated with two anchors (e.g., the anchors associated with the first character and last character), wherein the context section is determined based on a section identifier and the two anchors.

In some examples, the anchor includes metadata associated with a paragraph in the document, where the paragraph includes the content selection. As an example, the anchor is metadata associated with an invisible character (e.g., a first invisible character) of the paragraph. In one example, the anchor is metadata associated with a paragraph within a cell in a table. As an example, the anchor is metadata associated with a cell identifier of a cell in a table or a spreadsheet. In certain examples, the content selection is associated with a document identifier, a section identifier and an anchor, and the context section is determined based on the document identifier, the section identifier, and the anchor. In some examples, the content selection is associated with a document identifier, a section identifier, a fragment identifier, and an anchor, and the context section is determined based on the document identifier, the section identifier, the fragment identifier, and the anchor.

In certain embodiments, the computing device is configured to obtain (e.g., receive from a software interface, receive from a network connection, retrieve from a data repository) a second document in a second language (240) different from the primary language. The second document includes one or more sections or all sections of the primary document translated in the second language.

In some embodiments, before transmitting the second document for review, an access control to the second document is assigned to the second user. The access control may include view-only (e.g., not editable), editable, selections, annotations, comments, and/or the like. The access control may include access to certain sections in the second document. In certain embodiments, a review configuration associated with the second user is received (e.g., retrieved or obtained) by the computing device. In some examples, the review configuration includes whether the second user is allowed to or prefers to receiving inputs/comments from other users/reviewers, and what inputs/comments is allowed to or preferred to being received.

Based on the review configuration of the second user, the computing device transmits the second document with or without the first input to the second user for review (245). In some examples, the first input is populated with the second document based on content identifiers. In certain examples, the computing device is configured to retrieve inputs/comments (e.g., the first input from the first user) from other reviewers and incorporate or populate the inputs/comments in the second document. In some examples, the inputs/comments are populated based on one or more content identifiers associated with the first document, the second document, the primary document, and/or document sections.

In some embodiments, the computing device is configured to receive a second input associated with a commented section in the second document (250). In some examples, the one or more sections of the second document is associated with the sections in the primary document via content identifiers. In certain examples, the content identifiers are related to the data structure used to store documents (e.g., tree structures, branch models, etc.). In some embodiments, the commented section and/or the content selection are associated with one or more content identifiers.

In some examples, the computing device is configured to identify and select the primary document associated with the second document based on content identifiers (e.g., document ID, section ID, pointer, tree ID, etc.). In certain examples, the computing device is configured to populate the second input to the primary document (255). In some embodiments, the computing device is configured to select or determine a context section in the primary document associated with the commented section and/or the content selection based on the content identifiers of the respective commented section and/or the content selection.

In certain embodiments, the context section has more content information than the content information of the comment selection. For example, the content selection in the second document is a few words in a part of a sentence and the context section in the second document is the entire sentence or the paragraph containing the sentence in the primary document. In some embodiments, the context section has more content information than the content information of the comment selection, for example, to reduce word selection errors because of translation and/or to reduce resource usage for word selections across languages.

In some examples, the context section in the primary document has a character count of a first character number (e.g., 50 characters) and the content selection in the second document has a character count of a second character number (e.g., 15 characters), where the first character number is different from the second character number. In some instances, the first character number is greater than the second character number. In certain instances, the first character number is smaller than the second character number. In certain examples, the context section in the primary document has a word count of a first word number (e.g., 20 words) and the content selection in the second document has a word count of a second word number (e.g., 5 words), where the first word number is different from the second word number. In some instances, the first word number is greater than the second word number. In certain instances, the first word number is smaller than the second word number. In some examples, the content selection in the second document is associated with at least one anchor (e.g., an anchor associated with a character, an anchor associated with a paragraph, an anchor associated with a cell identifier), wherein the context section is determined based on a section identifier and the at least one anchor. In certain examples, the content selection in the second document is associated with two anchors (e.g., the anchors associated with the first character and last character), wherein the context section is determined based on a section identifier and the two anchors.

Figure 3A:
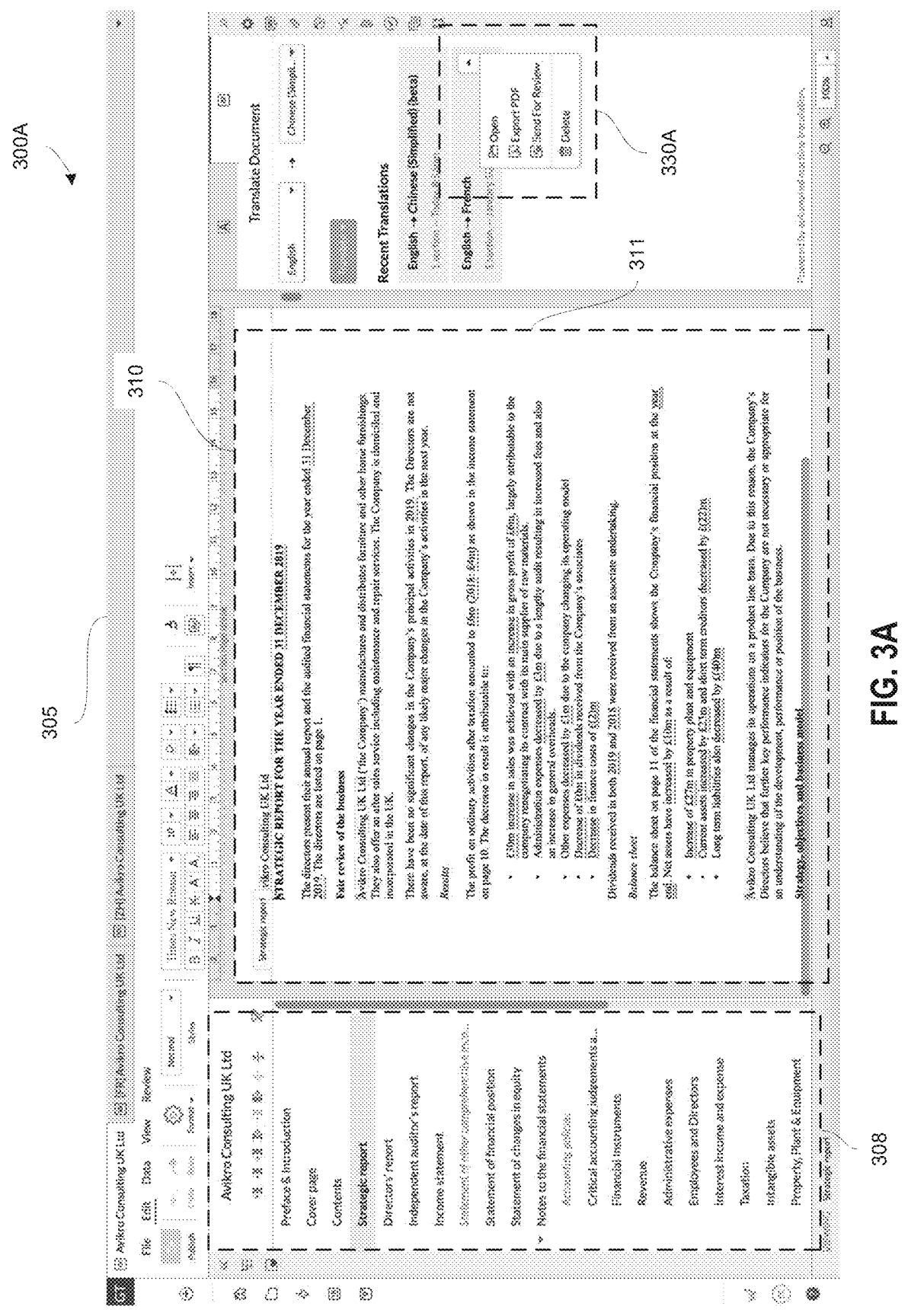
Figure 3B:
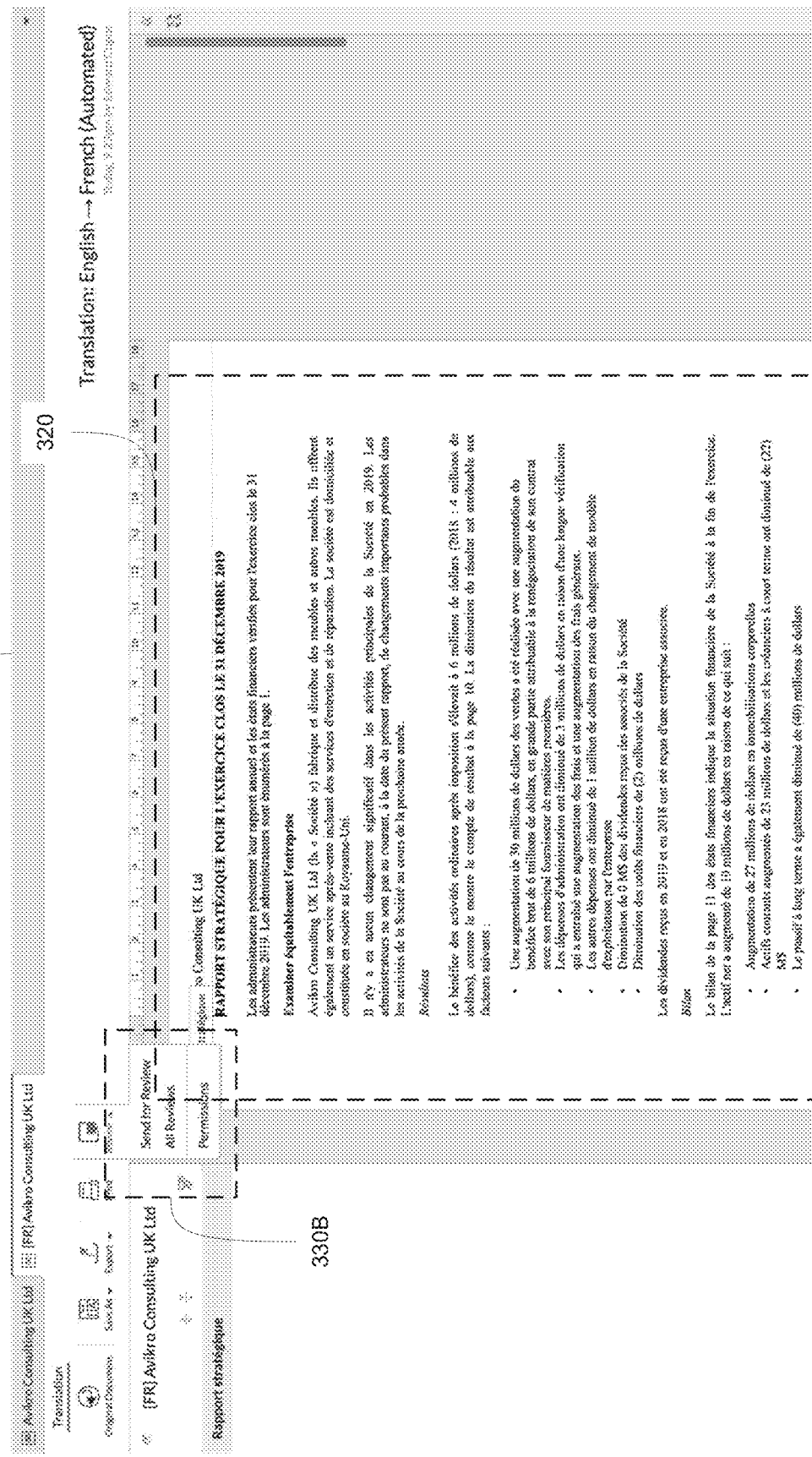

FIGS. 3A-3H are example graphical user interfaces of a system for translation comment flowback, in accordance with certain embodiments of the present disclosure. FIG. 3A illustrates a graphical user interface 300A presents a primary document 310 in English with a number of document sections 308, and one specific section 311. The graphical user interface 300A is generated by a software application 305 executed a processor (e.g., the document management device 110 in FIG. 1). The graphical user interface 300A may include a controlling component 330A allowing to open a secondary document, such as a document with one or more sections or all sections of the primary document 310. After receiving a selection (e.g., Open) to the controlling component, the software application 305 is configured to initiate a new tab in the graphical user interface 300B illustrated in FIG. 3B.

FIG. 3B illustrates a graphical user interface 300B generated by the software application 305 including a representation of a translated document 320 including section 311 translated in a language different from the primary document 310, in response to a user selection to the controlling component 330A. The graphical user interface 300B includes a controlling components 330B allowing to set permissions to the translated document 320 (e.g., the document 124, 134, and 154), configuring whether and what reviewing inputs will be sent with the translated document 320, and sending the translated document 320 with or without other reviewing inputs (e.g., "Send for Review" command).

Figure 3C:
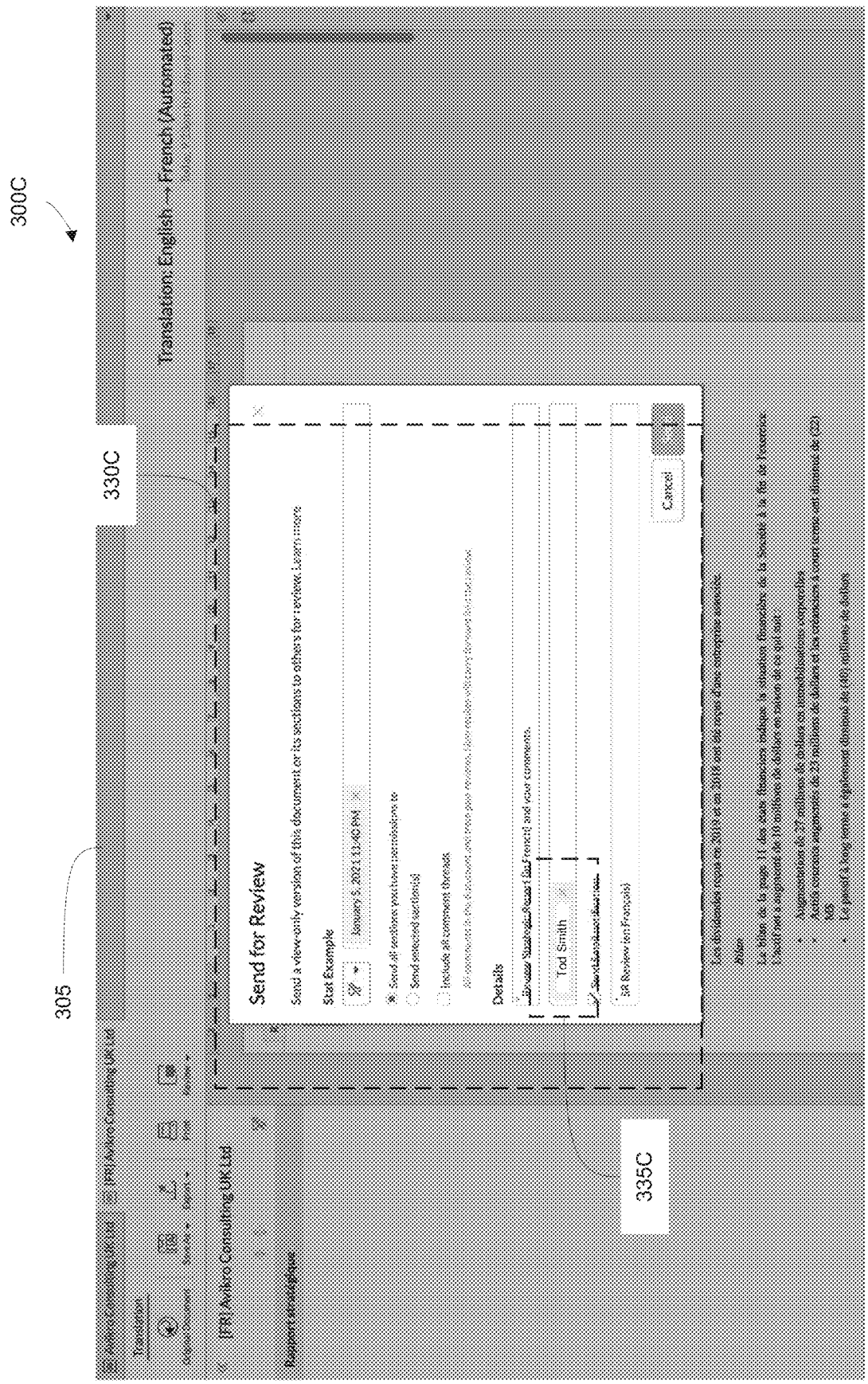

FIG. 3C illustrates a graphical user interface 300C generated by the software application 305 in response to a user selection to "Send for Review" command in the controlling component 330B. In one example, the controlling component 330C allows a user to select information to be sent with the translated document 320, for example, all sections with permissions, selected sections, inputs from comment threads (e.g., comments/inputs from past reviews). In some examples, the controlling component 330C includes information 335C related to the user/reviewer.

Figure 3D:
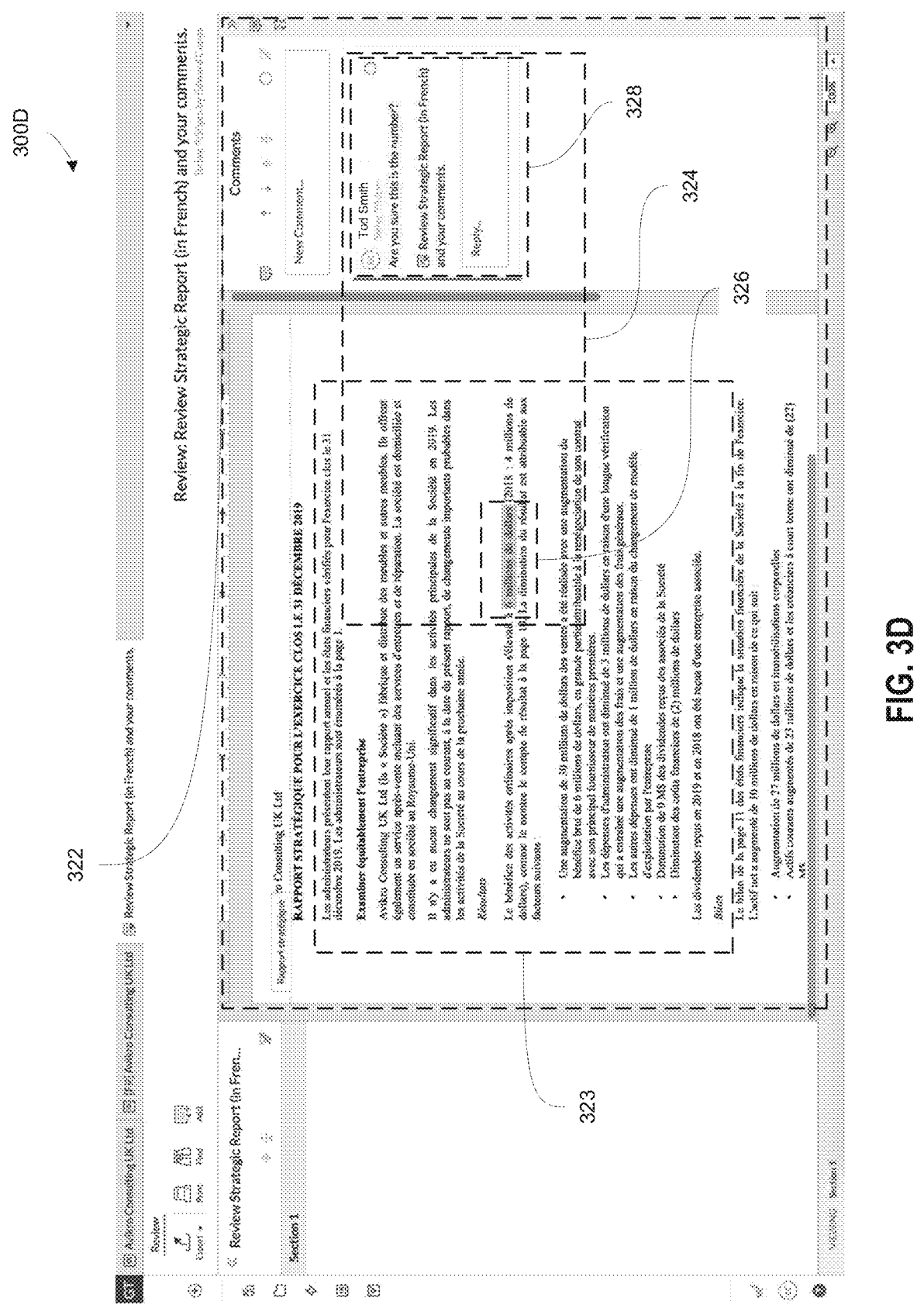

FIG. 3D illustrates a graphical user interface 300D, after the translated document 320 is sent for review. The graphical user interface 300D may be generated by the software application 305 and presented on a user device, or generated by a review application running on the user device. The graphical user interface 300D presents the commented section 323 to be reviewed by the user. After review, the user may generate an input 324 via the user device, where the input 324 includes content selection 326 and the comment 328. The content selection 326, in the example illustrated, includes four (4) highlighted words. The document 322 includes the translated document 320 and the input 324. In some examples, the document 322 can be sent back to the software application 305 illustrated in FIG. 3A. In certain examples, the document 322 can be stored in a data repository (e.g., the data repository 114 in FIG. 1) for processing. In some examples, only the input 324 with associated metadata is sent back to the software application 305 or stored in a data repository.

Figure 3E:
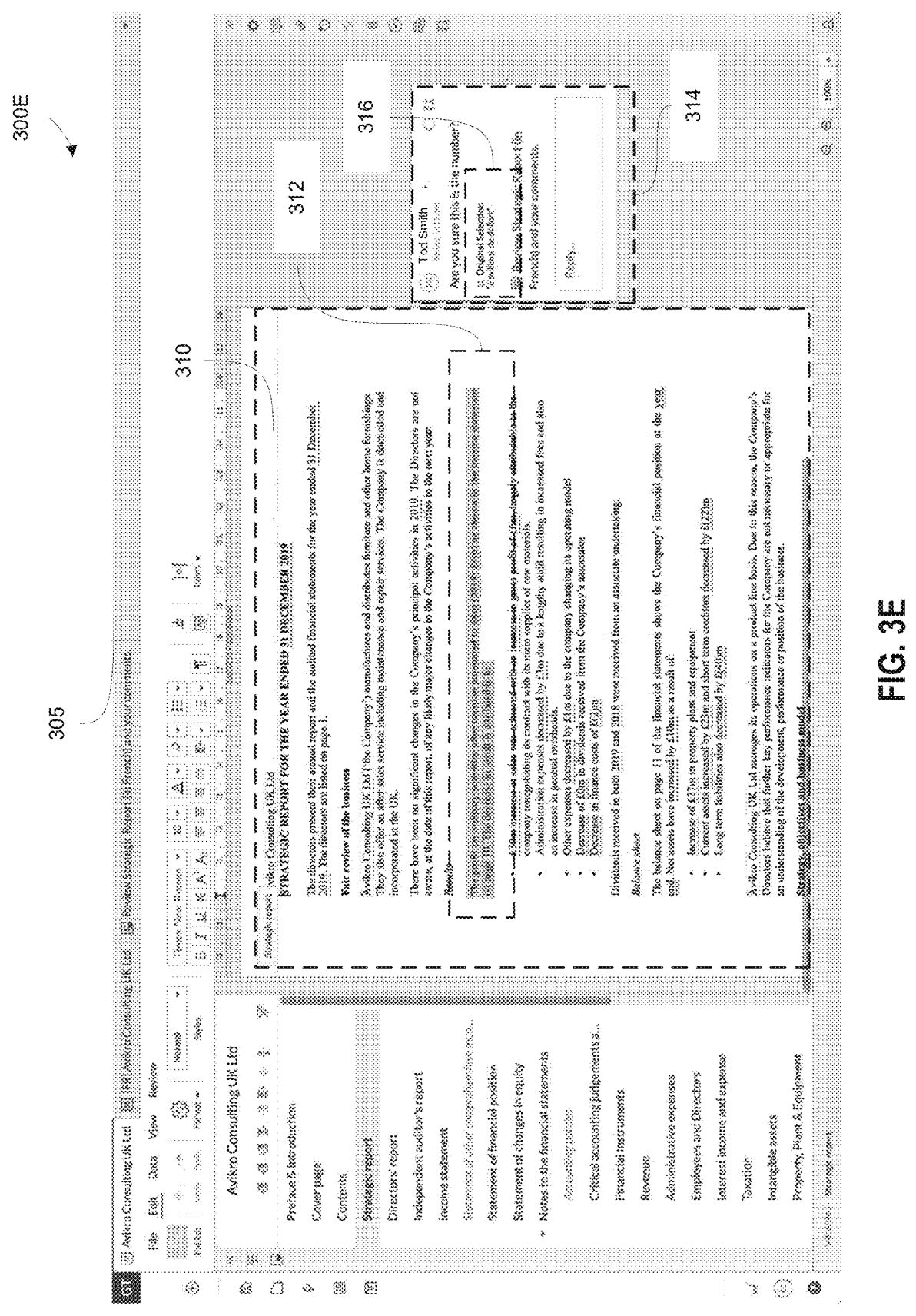

FIG. 3E illustrates a graphical user interface 300E generated by the software application 305 after the input 324 is received. The software application 305 can determine or select a context section 312 and presented the comment from the user as 314. In one example, the comment 314 includes the comment 328 and the content selection 316 corresponding to the content selection 326 in FIG. 3D. In the example illustrated, the context section 312 is a paragraph corresponding to the content selection. In some examples, the context section 312 has more content information than the content selection 326.

Figure 3F:
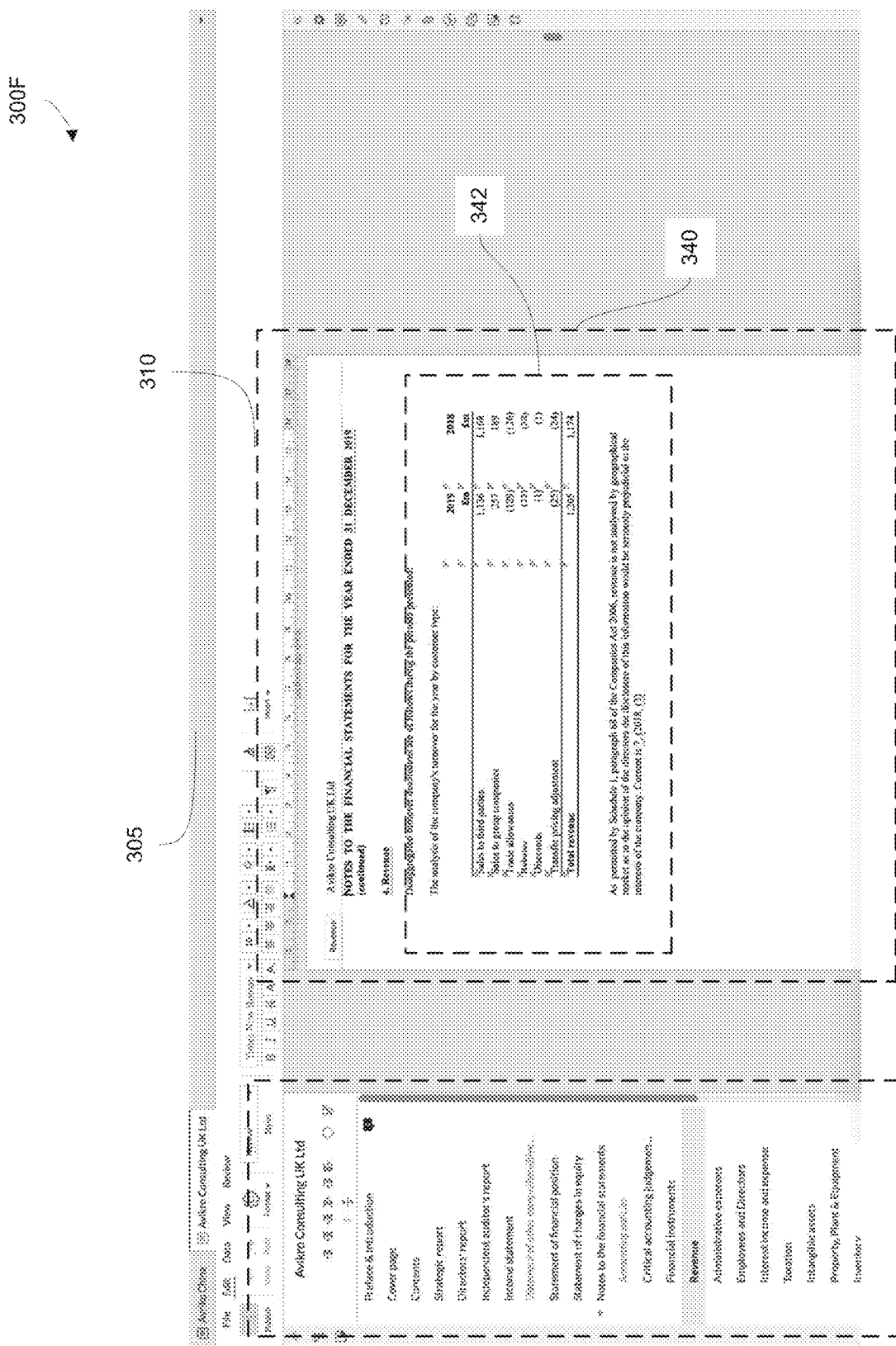
Figure 3G:
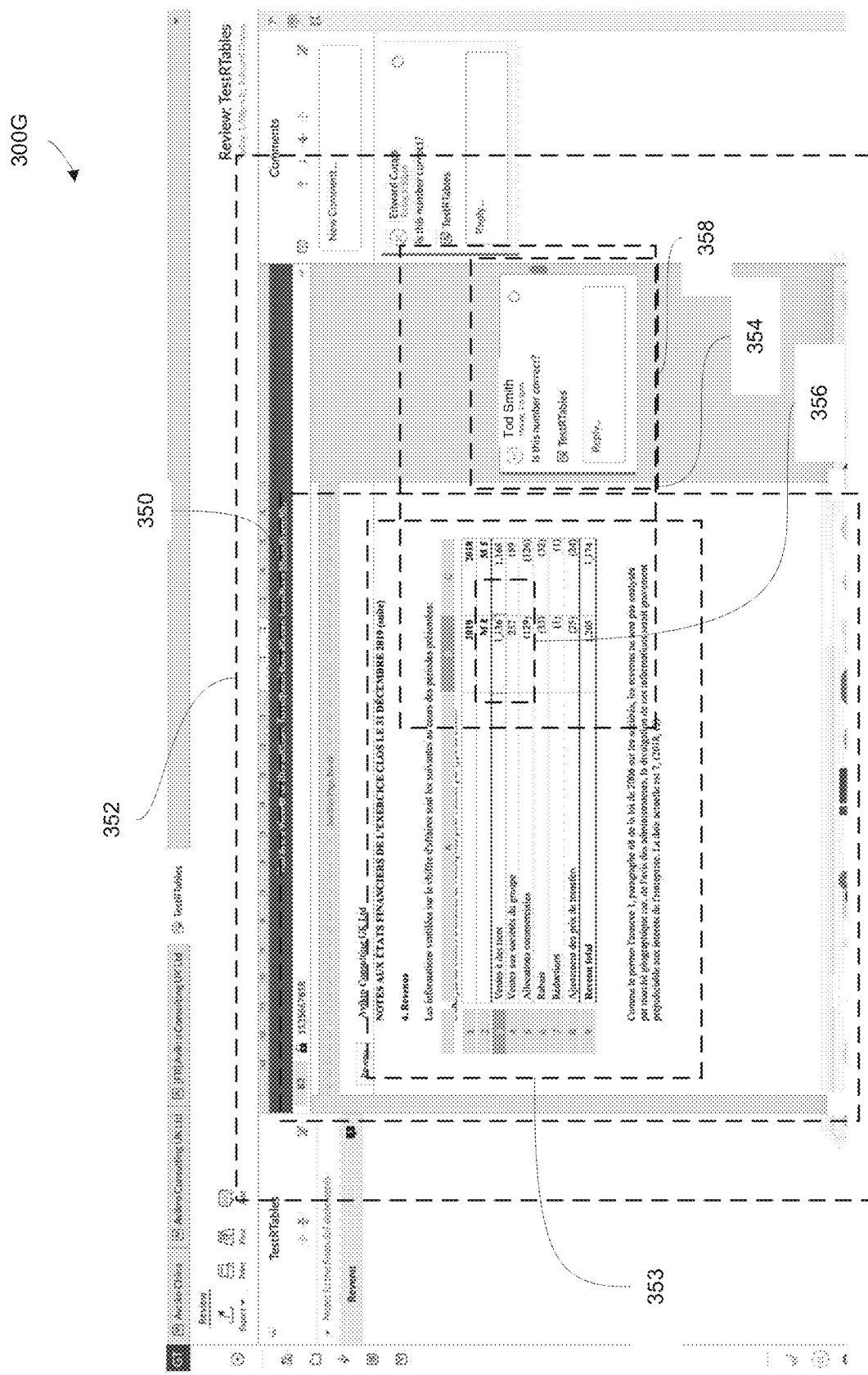

FIG. 3F illustrates a graphical user interface 300F presents the primary document 310 in English with a number of document sections 308, and one specific section 340. In the example illustrated, the document section 340 includes a table 342 with multiple cells. FIG. 3G illustrates a graphical user interface 300G, after a translated document 350 is sent for review. The translated document 350 may include the document section 340 translated to a different language. In some examples, the translated document 350 may be a same document as the translated document 320 such that the document 350 includes both section 311 and 340 being translated into a different language. In certain examples, the translated document 350 may be a different document from the translated document 320.

The graphical user interface 300G may be generated by the software application 305 and presented on a user device, or generated by a review application running on the user device. The graphical user interface 300G presents the commented section 353 to be reviewed by the user. After review, the user may generate an input 354 via the user device, where the input 354 includes content selection 356 and the comment 358. The content selection 356, in the example illustrated, includes one cell in the table. In some examples, the document 352 including the translated document 350 and the input 354 is generated. In some examples, the document 352 can be sent back to the software application 305 illustrated in FIG. 3A. In certain examples, the document 352 can be stored in a data repository (e.g., the data repository 114 in FIG. 1) for processing. In some examples, only the input 354 with associated metadata is sent back to the software application 305 or stored in a data repository.

Figure 3H:
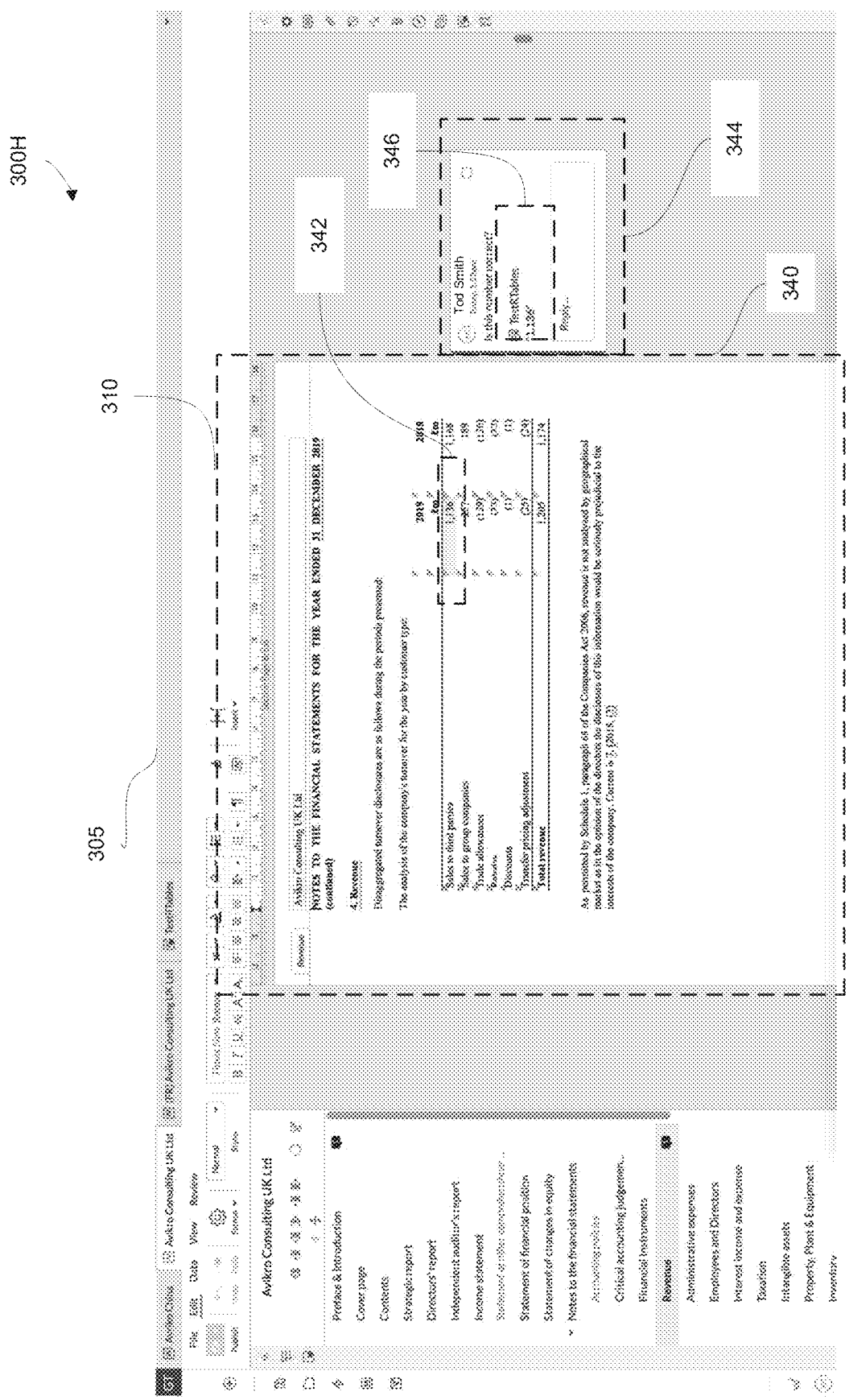

FIG. 3H illustrates a graphical user interface 300H generated by the software application 305 after the input 354 is received. The software application 305 can determine or select a context section 342 and presented the comment from the user as 344. In one example, the comment 344 includes the comment 358 and the content selection 346 corresponding to the content selection 325 in FIG. 3G. In the example illustrated, the context section 342 is a cell corresponding to the content selection.

Figure 4A:
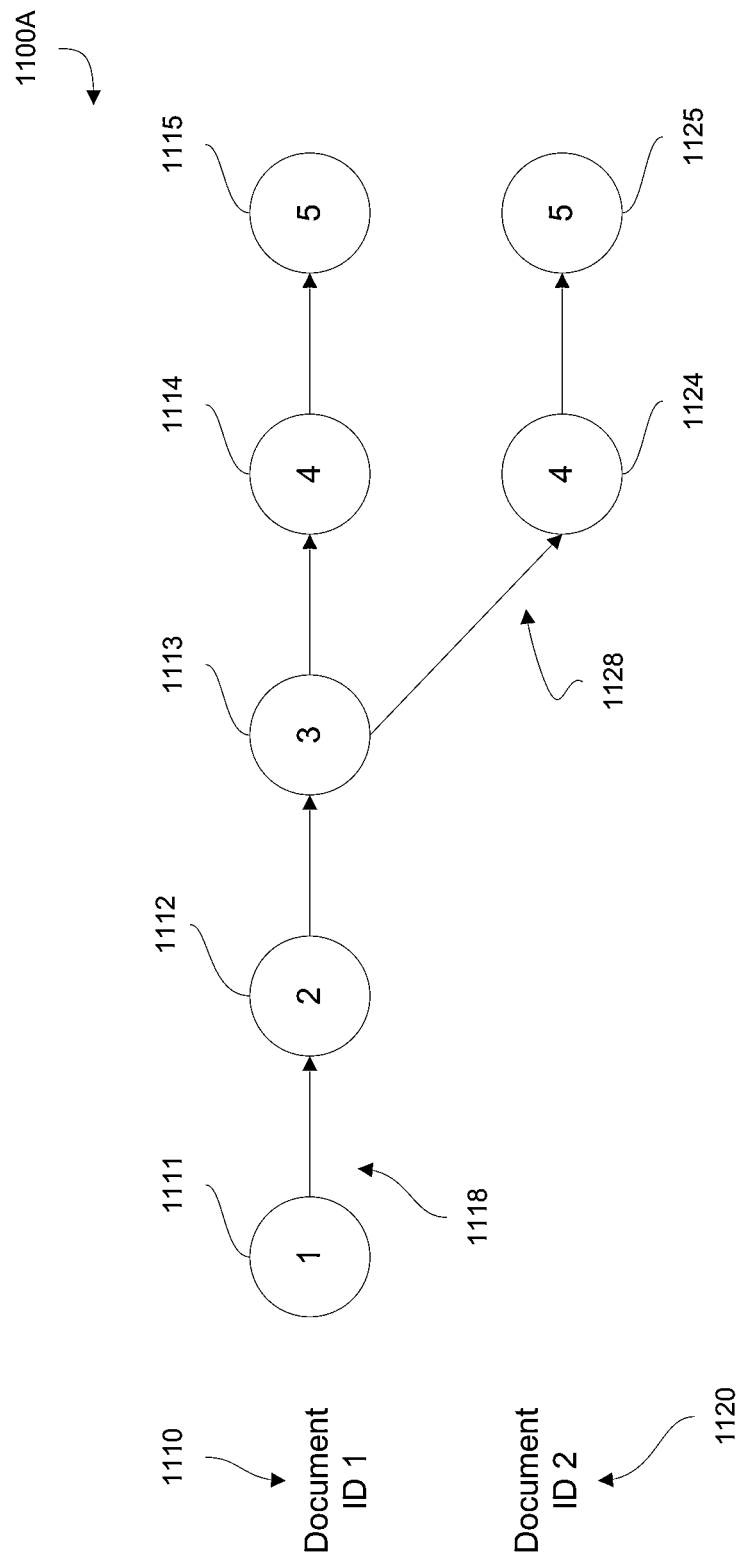
FIG. 4A shows one example of a branch model, in accordance with certain embodiments of the present disclosure.

In certain embodiments, a document or a plurality of related documents (e.g., translated documents for review, translated sections for review) are implemented with a branch model. In some examples, the branch model can maintain revision relationships, comments, edits, edits with mark-ups, translations, and/or other relationships. FIG. 4A shows one example of a branch model, in accordance with certain embodiments of the present disclosure. In certain embodiments, the branch model can be implemented by a computing device (e.g., the document management device 110 in FIG. 1, the computing devices 120, 130, and 150 in FIG. 1, etc.). As illustrated, the branch model 1100A is related to a primary document 1110 (e.g., a mainline document, a secondary document, etc.) associated with document ID 1 and a secondary document 1120 associated with document ID 2. In some examples, the primary document 1110 is a mainline document. In some examples, the primary document 1110 is not a mainline document but is a secondary document. The primary document is associated a branch 1118, or referred to as a primary branch. In some variations, the branch 1118 is a mainline branch, or referred to as a main branch, in the branch model 1100A. The secondary document 1120 is associated with as a secondary branch 1128 in the branch model 1100A. In some examples, the primary document 1110 and/or the secondary document 1120 can be one of a review document, an edited document with mark-ups (or referred to as a comparison document or a blackline document), a comparison review document, a translation document, and other documents generated based on the mainline document.

In certain embodiments, each branch in the branch model 1100 includes a branch type and one or more nodes. In some implementations, each node is associated with a revision of a document (e.g., revision 1 of document 1110) In some examples, each branch in the branch model 1100 is associated with a document with a document identifier. In some embodiments, the primary branch 1118 includes one or more nodes 1111, 1112, 1113, 1114, and 1115, where each node is associated with a revision of the primary document 1110. In some cases, each node is associated with a revision of a document. For example, node 1111 is associated with revision 1 of the document of document ID 1 (e.g., mainline document). For example, node 1112 is associated with revision 2 of the document of document ID 1 (e.g., mainline document). For example, node 1113 is associated with revision 3 of the document of document ID 1 (e.g., mainline document). For example, node 1114 is associated with revision 4 of the document of document ID 1 (e.g., mainline document). For example, node 1115 is associated with revision 5 of the document of document ID 1 (e.g., mainline document).

In certain embodiments, the secondary branch 1128 includes one or more nodes 1124 and 1125, where each node associated with a revision of the secondary document. For example, node 1124 is associated with revision 4 of the document of document ID 2 (e.g., a secondary document). For example, node 1125 is associated with revision 5 of the document of document ID 2 (e.g., a secondary document). In some examples, the branch 1118 is a primary branch that the secondary branch 1128 is generated based on. In certain examples, the secondary branch 1128 is generated based on a revision of the primary document 1110. For example, the secondary branch 1128 is generated based on revision 3 of the primary document 1110 and linked to node 1113. In some examples, the branch 1118 is of a secondary branch type. In one example, the branch 1118 is of a comparison branch type and the branch 1128 is of a comparison review branch type.

In some implementations, a reviewer is only granted a permission to access certain section(s) of a document. In some examples, a reviewer does not have access to the mainline document, but only have access to certain section(s) of a document. In some examples, a reviewer is granted access to the mainline document or all sections of a document.

In some embodiments, a branch in a branch model includes a branch type and one or more nodes. In some variations, the branch type includes a mainline branch type associated with the mainline document (e.g., a master document) and a secondary branch type associated with a secondary document (e.g., a comparison document, a review document, a translation document, etc.). In certain variations, the secondary branch type further includes a review branch type, a comparison branch type, a comparison review branch type, a translation branch type, and other branch types associated with a secondary document. In some implementations, the secondary branch type is associated with a purpose (e.g., review, blackline, translate, etc.) of generating a branch (e.g., a divergence) in the branch model. In some examples, the permission granted to a reviewer is associated with the branch type.

In certain embodiments, the review branch type indicates a branch generated for reviewing a document. In some examples, a reviewer can only add comments during a review and cannot make edits (e.g., additions, modifications, or deletions) to the document being reviewed. In some examples, a reviewer can make additions, modifications, and/or deletions to the document being reviewed and add, modify, or delete comments from the document to be reviewed. In one example of the secondary document 1120 being a review document represented by the review branch 1128, the one or more nodes 1124 and 1125 are associated with document data structures (e.g., RTree, causal tree, causal graph, cells, etc.) containing comments provided by the reviewer. In one example of the secondary document 1120 being a review document represented by the review branch 1128, the one or more nodes 1124 and 1125 associated with document data structures (e.g., RTree, causal tree, causal graph, cells, etc.) containing comments edits (e.g., additions, modifications, and/or deletions), and/or edits with mark-ups provided by the reviewer.

In some embodiments, the comparison branch type indicates a branch generated for editing a document with mark-ups, or referred to as a comparison document (e.g., blackline document). In one example of the secondary document 1120 being a comparison document represented by the comparison branch 1128, the one or more nodes 1124 and 1125 are associated with document data structures (e.g., RTree, causal tree, causal graph, cells, etc.) containing blacklines, such as mark-ups showing additions, modifications, and deletions, provided by the reviewer.

In certain embodiments, the comparison review branch type indicates a branch generated for reviewing a comparison document (e.g., a blackline document). In some examples, a reviewer provides comments to the comparison document. In some examples, a reviewer can make additions, modifications, and/or deletions to the document being reviewed and add, modify, or delete comments from the document to be reviewed. In one example of the secondary document 1120 being a comparison review document represented by the comparison review branch 1128, the one or more nodes 1124 and 1125 are associated with document data structures (e.g., RTree, causal tree, causal graph, cells, etc.) containing comments provided by the reviewer. In one example of the secondary document 1120 being a comparison review document represented by the comparison review branch 1128, the one or more nodes 1124 and 1125 associated with document data structures (e.g., RTree, causal tree, cells, etc.) containing comments and/or changes (e.g., additions, modifications, and/or deletions) provided by the reviewer.

In some embodiments, the translation branch type indicates a branch generated for translating a document or a document section. In some examples, a reviewer can provide transactions to the document or the document section. In one example of the secondary document 1120 being a translated document represented by the translation branch 1128, the one or more nodes 1124 and 1125 are associated with document data structures (e.g., RTree, causal tree, cells, etc.) containing translations provided by the reviewer.

In some embodiments, branch 1128 indicates a divergence from the mainline branch 1118. In one example, branch 1128 in the branch model 1100 includes a data structure illustrated in Table 1. The branch 1128 includes a BranchID, a BranchedFromID, a BranchedFromRevision, and a BranchType. The BranchID is the identifier of the branch. The BranchedFromID is the document identifier of the document (e.g., mainline document, secondary document, etc.) from which the branch is created. The BranchedFromRevision is the document revision of the document from which the branch is created. For example, branch 1128 has a BranchedFromID being the Document ID 1 and BranchedFromRevision being "3".

TABLE 1

| Field | Type | Length |
| --- | --- | --- |
| BranchID | VARCHAR | 255 |
| BranchedFromID | VARCHAR | 255 |
| BrancedFromRevision | BIGINT | 20 |
| BranchType | INT | 11 |

Using the branch model illustrated in FIG. 11A, the data structures representing the mainline document revision does not need to be duplicated. Instead, the revisions of a secondary document (e.g., revisions 4 and 5 of the secondary document) are linked to the data structures of the mainline document where the branch is generated.

In some embodiments, when an input (e.g., reviews, comments, blacklines, translations, etc.) from a reviewer is requested, a computing device (e.g., the document management device 110 in FIG. 1, the computing devices 120, 130 and 150 in FIG. 1, etc.) generates the secondary branch 1128 at a branch creation time, based upon a node 1113 of the primary branch 1118. In some examples, the node 1113 of the primary branch 1118 is associated with a current revision of the primary document 1110 at the branch creation time. In some examples, when the input from a reviewer is received, the computing device generates a node (e.g., node 1124) associated with a document revision incorporating the input and adds the node to the secondary branch 1128. If the secondary branch 1128 exists, when the input from a reviewer is received, the computing device generates a node (e.g., node 1125) associated with a document revision incorporating the input and adds the node to the secondary branch 1128.

In certain embodiments, when an input from a reviewer is requested, the computing device checks whether a corresponding secondary branch 1128 exists. In some examples, the secondary branch 1128 is corresponding to the reviewer, a reviewer group, and/or the type of the input request. In some examples, the secondary branch 1128 is corresponding to a revision of the primary document and the type of the input request. If a secondary branch does not exist, the computing device generates the secondary branch 1128 of a secondary branch type, where the secondary branch type corresponds to the type of the input being requested. In some examples, the computing device generates a node (e.g., node 1124) representing a document revision incorporating the input and adds the node to the secondary branch. If the secondary branch 1128 exists, when the input from a reviewer is received, the computing device generates a node (e.g., node 1125) associated with a document revision incorporating the input and adds the node to the secondary branch 1128. In certain embodiments, the input can be selectively incorporated into the primary document 1110 as a revision. In some embodiments, the input can be selectively incorporated into a corresponding mainline document as a revision.

In some embodiments, when an input is received from a reviewer, the computing device checks whether a corresponding secondary branch 1128 exists. If a secondary branch associated with the reviewer does not exist, the computing device generates the secondary branch 1128 of a secondary branch type corresponding to the type of the input. In some examples, the computing device generates a node (e.g., node 1124) associated with a document revision incorporating the input and adds the node to the secondary branch 1128. If the secondary branch 1128 exists, when the input from a reviewer is received, the computing device generates a node (e.g., node 1125) associated with a document revision incorporating the input and adds the node to the secondary branch 1128.

In certain embodiments, the computing device generates a node representing a revision of the primary or mainline document based upon the input and adds the node to the primary or mainline branch. In one example of the input being one or more comments from the reviewer, the revision of the primary or mainline document can be the primary or mainline document with the one or more comments. In one example of the input being one or more comments from the reviewer, the revision of the primary or mainline document can be the primary or mainline document with blacklines, where the blacklines are generated based on the one or more comments. In one example of the input being one or more blacklines from the reviewer, the revision of the primary or mainline document can be the primary or mainline document with blacklines. In one examples of the input being translations from the reviewer, revision of the primary or mainline document can be a localized (i.e., translated) version of the primary or mainline document or a document section of the primary or mainline document.

Figure 4B:
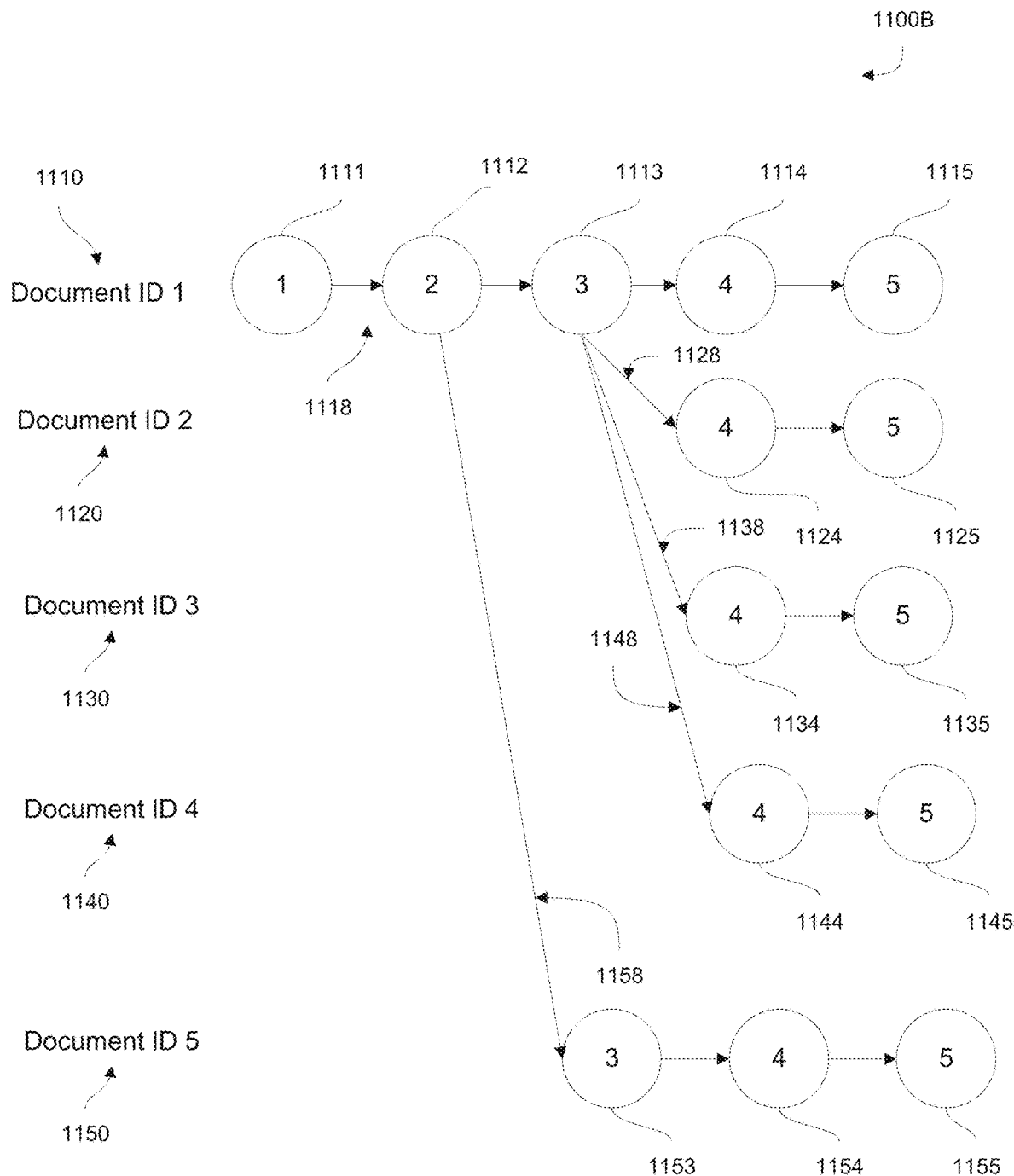
FIG. 4B shows another example of a branch model, in accordance with certain embodiments of the present disclosure.

FIG. 4B shows another example of a branch model, in accordance with certain embodiments of the present disclosure. In certain embodiments, the branch model 1100B can be implemented by a computing device (e.g., the document management device 110 in FIG. 1, the computing devices 120, 130, and 150 in FIG. 1, etc.). As illustrated, the branch model 1100B is related to a primary document 1110 (e.g., a mainline document, a secondary document, etc.) associated with document ID 1, a secondary document 1120 associated with document ID 2, a secondary document 1130 associated with document ID 3, a secondary document 1140 associated with document ID 4, and a secondary document 1150 associated with document ID 5. In some examples, the primary document 1110 is a mainline document. In some examples, the primary document 1110 is not a mainline document. The primary document is associated a branch 1118, or referred to as a primary branch. In some variations, the branch 1118 is a mainline branch, or referred to as a main branch, in the branch model 1100B.

The secondary document 1120 is associated with as a secondary branch 1128 in the branch model 1100B. The secondary document 1130 is associated with as a secondary branch 1138 in the branch model 1100B. The secondary document 1140 is associated with as a secondary branch 1148 in the branch model 1100B. The secondary document 1150 is associated with as a secondary branch 1158 in the branch model 1100B. In some examples, the primary document 1110 and/or any one of the secondary documents (1120, 1130, 1140, 1150) can be one of a review document, an edited document with mark-ups (or referred to as a comparison document or a blackline document), a comparison review document, a translation document, and other documents generated based on the mainline document.

In certain embodiments, each branch (e.g., 1118, 1128, 1138, 1148, and 1158) in the branch model 1100 includes a branch type and one or more nodes. In some examples, each branch in the branch model 1100 is associated with a document with a document identifier. In some embodiments, the primary branch 1118 includes one or more nodes 1111, 1112, 1113, 1114, and 1115, where each node is associated with a revision of the primary document 1110. In some cases, each node is associated with a revision of a document. For example, node 1111 is associated with revision 1 of the document of document ID 1 (e.g., mainline document). For example, node 1112 is associated with revision 2 of the document of document ID 1 (e.g., mainline document). For example, node 1113 is associated with revision 3 of the document of document ID 1 (e.g., mainline document). For example, node 1114 is associated with revision 4 of the document of document ID 1 (e.g., mainline document). For example, node 1115 is associated with revision 5 of the document of document ID 1 (e.g., mainline document).

In certain embodiments, the secondary branch 1128 includes one or more nodes 1124 and 1125, where each node associated with a revision of the secondary document. For example, node 1124 is associated with revision 4 of the document of document ID 2 (e.g., a secondary document). For example, node 1125 is associated with revision 5 of the document of document ID 2 (e.g., a secondary document). In some examples, the branch 1118 is a primary branch that the secondary branches 1128, 1138, 1148, and 1158 are generated based on. In some examples, the branch 1118 is of a secondary branch type. For example, the branch 1118 is of a comparison branch type and the branch 1128 is of a comparison review branch type.

In some implementations, a reviewer is only granted a permission to access certain section(s) of a document. In some examples, a reviewer does not have access to the mainline document, but only have access to certain section(s) of a document. In some examples, a reviewer is granted access to the mainline document or all sections of a document. In some embodiments, each branch type is associated with a specific permission. In certain embodiments, each branch is associated with a specific permission. In some examples, a permission allows edits with mark-ups and comments. In certain examples, a permission only allows comments. In some examples, a permission only allows translations.

In some embodiments, a branch in a branch model includes a branch type and one or more nodes. In some variations, the branch type includes a mainline branch type associated with the mainline document (e.g., a master document) and a secondary branch type associated with a secondary document (e.g., a blackline document, a review document, a translation document, etc.). In certain variations, the secondary branch type further includes a review branch type, a comparison branch type, a comparison review branch type, a translation branch type, and other branch types associated with a secondary document. In some implementations, the secondary branch type is associated with a purpose (e.g., review, blackline, translation, etc.) of generating a branch (e.g., a divergence) in the branch model.

In certain embodiments, the review branch type indicates a branch generated for reviewing a document. In some examples, a reviewer can only add comments during a review and cannot make additions, modifications, or deletions to the document being reviewed. In some examples, a reviewer can make additions, modifications, and/or deletions to the document being reviewed and add, modify, or delete comments from the document to be reviewed. In one example, the secondary branch 1128 is a review branch and the one or more nodes 1124 and 1125 are associated with document data structures (e.g., RTree, causal tree, causal graph, cells, etc.) containing comments provided by the reviewer. In one example of the secondary document 1120 being a review document represented by the review branch 1128, the one or more nodes 1124 and 1125 associated with document data structures (e.g., RTree, causal tree, causal graph, cells, etc.) containing comments, edits (e.g., additions, modifications, and/or deletions), and/or edits with mark-ups provided by the reviewer. In the example illustrated, the secondary branch 1128 is linked to the node 1113.

In one example, the secondary branch 1138 is a review branch and the one or more nodes 1134 and 1135 are associated with document data structures (e.g., RTree, causal tree, causal graph, cells, etc.) containing comments provided by the reviewer. In one example of the secondary document 1130 being a review document represented by the review branch 1138, the one or more nodes 1134 and 1135 associated with document data structures (e.g., RTree, causal tree, causal graph, cells, etc.) containing comments, edits (e.g., additions, modifications, and/or deletions), and/or edits with mark-ups provided by the reviewer. In one example, the secondary branch 1128 is associated with a first group of reviewers and the secondary branch 1138 is associated with a second group of reviewers.

In some embodiments, the comparison branch type indicates a branch generated for editing a document with mark-ups, or referred to as a comparison document (e.g., blackline document). In one example, the secondary branch 1128 is a comparison branch, the one or more nodes 1124 and 1125 are associated with document data structures (e.g., RTree, causal tree, causal graph, cells, etc.) containing blacklines, such as mark-ups showing additions, modifications, and deletions, provided by the reviewer. In one example, the secondary branch 1138 is also a comparison branch, and the one or more nodes 1134 and 1135 are associated with document data structures (e.g., RTree, causal tree, causal graph, cells, etc.) containing blacklines, such as mark-ups showing additions, modifications, and deletions, provided by the reviewer. In one example, the secondary branch 1128 is associated with a first group of reviewers and the secondary branch 1138 is associated with a second group of reviewers. In the example illustrated, the secondary branch 1138 is linked to the node 1113.

In certain embodiments, the secondary branch 1148 is a comparison branch associated with a comparison between document revisions associated with the secondary branch 1128 and document revisions associated with the secondary branch 1138. In one example, the one or more nodes 1144 and 1145 are associated with document data structures (e.g., RTree, causal tree, cells, etc.) containing comparisons of documents. In the example illustrated, the secondary branch 1148 is linked to the node 1113. In one example, the revision 4 of document 1140 is a comparison document by comparing the revision 4 of document 1120 with the revision 4 of document 1130.

In some embodiments, the translation branch type indicates a branch generated for translating a document or a document section. In some examples, a reviewer can provide transactions to the document or the document section. In one example, the secondary branch 1158 is a translation branch, the one or more nodes 1153, 1154 and 1155 are associated with document data structures (e.g., RTree, causal tree, cells, etc.) containing translations provided by the reviewer. In the example illustrated, the secondary branch 1158 is linked to the node 1112 and generated based on revision 2 of document 1110.

In some embodiments, the branch model 11001B supports various queries. In some examples, the computing device conducts a query of certain reviews and/or certain comparisons. In one example, the document revisions associated with the secondary branches 1128, 1138, and 1148 are query results in response to a query of certain reviews. In certain examples, the computing device conducts a query of translations. In one example, the document revisions associated with the secondary branch 1158 are query results in response to a query of translations.

Figure 5:
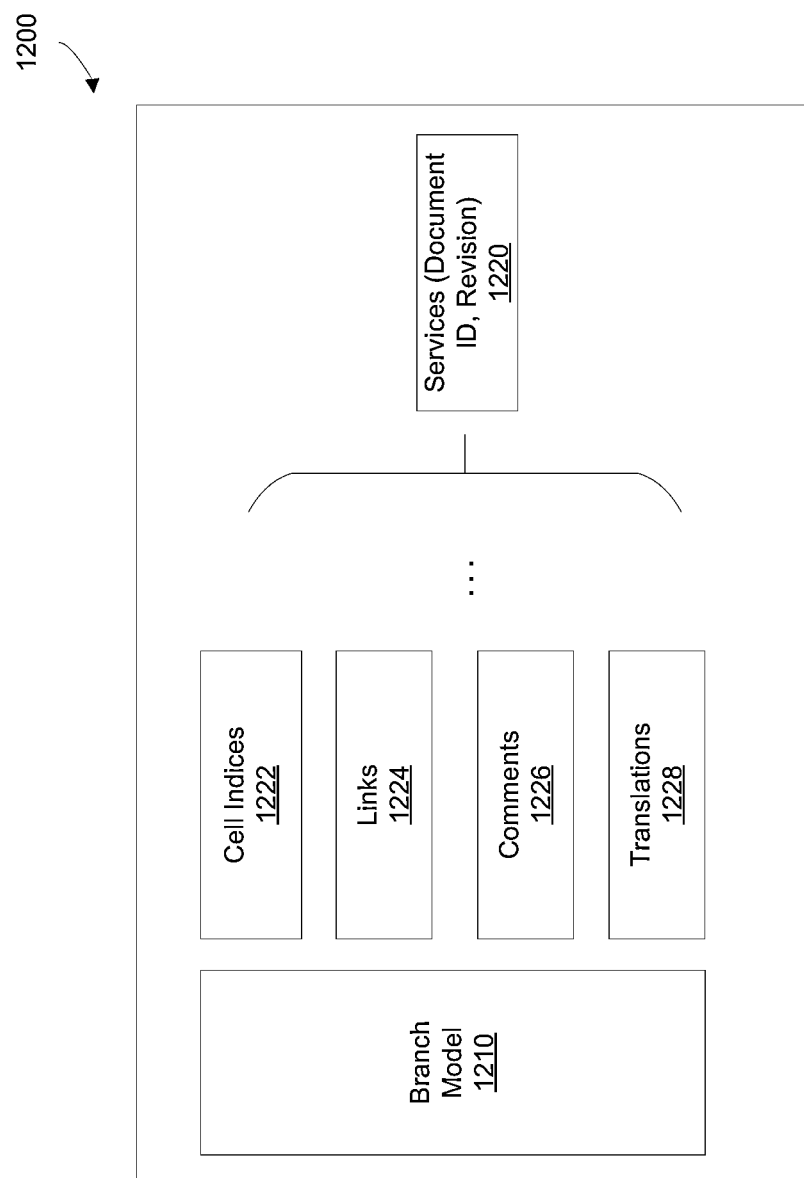
FIG. 5 illustrates one example of a document data structure using a branch model, in accordance with certain embodiments of the present disclosure.

FIG. 5 illustrates one example of a document data structure 1200 using a branch model, in accordance with certain embodiments of the present disclosure. As illustrated, the document data structure 1200 includes a plurality of document services, where each service is associated with a document identifier and a document revision identifier. In some examples, the plurality of document services include one or more of cell indices services 1222, link services 1224, comment services 1226, translation services 1228, and other services. The cell indices services 1222 store and provide cell indices of a document revision. The link services 1224 store and provide links of a document revision. The comment services 1226 store and provide comments of a document revision. The translation services 1228 store and provide translations of a document revision. In some embodiments, each service of the plurality of services 1220 is associated with a node in the branch model 1210, where the node in the branch model 1210 is associated with a respective document revision.

Figure 6:
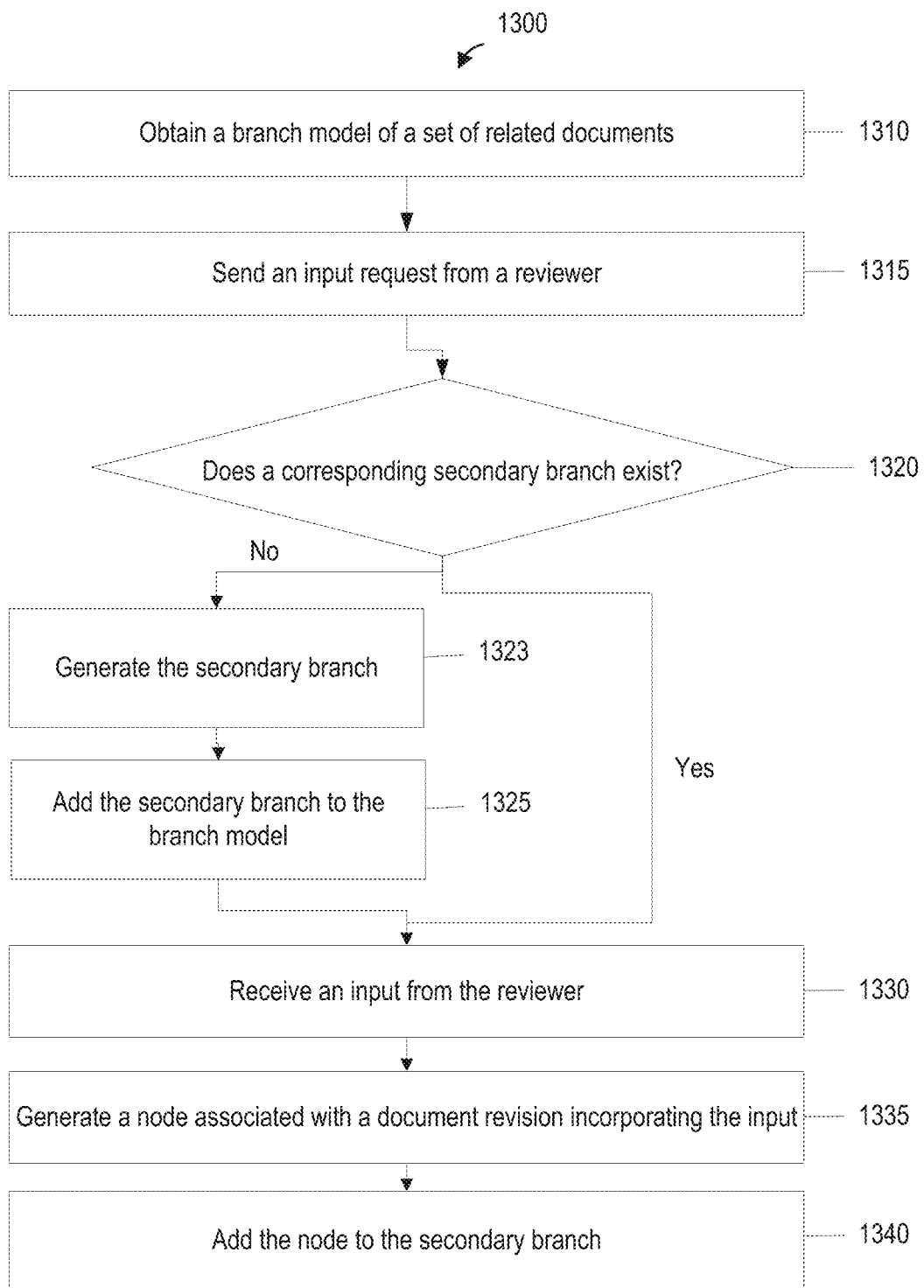
FIG. 6 is a flowchart illustrating one example of a method for using a branch model, for example, using the branch model for translation comment flowback, in accordance with certain embodiments of the present disclosure.

FIG. 6 is a flowchart illustrating one example of a method 1300 for using a branch model, for example, using the branch model for translation comment flowback, in accordance with certain embodiments of the present disclosure. Aspects of embodiments of the method 1300 are performed, for example, by a computing device (e.g., the computing devices 120, 130, and 150 in FIG. 1, the document management device 110 in FIG. 1). In some implementations, one or more steps of method 1300 are optional and/or modified by one or more steps of other embodiments described herein. In some implementations, one or more steps of other embodiments described herein are added to the method 1300. In some embodiments, the computing device obtains a branch model associated with a set of related documents (1310). In some examples, the set of related documents includes a mainline document and one or more secondary document that are generated by review and revision actions. In some examples, the branch model comprises one or more branches, where each branch of the one or more branches comprises a branch type and one or more nodes. In certain examples, each branch of the one or more branches is associated with a document with a document identifier. In some examples, the one or more branches comprise a mainline branch of a mainline branch type and associated with a mainline document, where the mainline branch type indicates a branch is associated with the mainline document that is the master document.

In certain embodiments, the computing device sends an input request from a reviewer (1315). The input request can be a review of a document or a document section, a comparison review of a document or a document section, a review of a blackline document or a document section in the blackline document, a translation of a document or a document section, and/or other review and revision request. The computing device may grant the reviewer a permission to access the document or the document section according to the input request. In some examples, the document being requested for input is referred to as the primary document. In some examples, the primary document is associated with a branch, or referred to as a primary branch.

In some embodiments, the computing device checks whether a corresponding secondary branch exists (1320). In some cases, the secondary branch is corresponding to the reviewer and/or the type of the input. In some cases, the secondary branch is corresponding to a revision of the primary document and a type of the input request. If the secondary branch does not exist, the computing device generates a secondary branch (1323) of a secondary branch type corresponding to the type of the input, where the secondary branch is associated with a secondary document. In some examples, the secondary branch includes a branch type, a documentation identifier of the primary document, and a revision identifier of the document revision that the branch is created based upon. In some variations, the secondary branch is generated based upon a current node of the primary branch at a branch creation time, where the current node of the primary branch is associated with a current revision of the primary document at the branch creation time. In certain variations, the branch type comprises at least one of a mainline branch type, a review branch type, a comparison branch type, a comparison review branch type, and a translation branch type.

In some implementations, the computing device further adds the secondary branch to the branch model (1325). In some examples, the secondary branch is added from the node associated with the revision of the primary document that is requested input. In some examples, a secondary document with a unique document identifier is generated and associated with the secondary branch. In some variations, the secondary document is associated with the node associated with the revision of the primary document that is requested input.

In certain embodiments, the computing device receives an input associated with the secondary document from the reviewer (1330). In some examples, the computing device generates a node associated with a secondary document revision (e.g., a document revision of the secondary document) incorporating the input (1335). In some variations, a document revision incorporating the input is to include the comments from the reviewer in the document revision. In certain variations, a document revision incorporating the input is to include changes based upon the comments from the reviewer in the document revision. In some variations, a document revision incorporating the input is to include the blackline(s) from the reviewer in the document revision. In certain variations, a document revision incorporating the input is to include the translations from the reviewer in the document revision or to replace a part or all of the document with the translations from the reviewer in the document revision.

In some embodiments, the computing device adds the node associated with the secondary document revision to secondary branch in the branch model (1340). In certain embodiments, the computing device generates a node associated with a revision of a primary or mainline document based upon the input and adds the node to the primary or mainline branch. In some examples, the revision of the mainline document is populated to one or more secondary documents.

In certain embodiments, each document revision is represented by one or more document services such as cell indices services, comment services, link services, translation services, and/or other document services. In some examples, each document service of a respective document revision is associated with one of the one or more nodes in the branch model.

Figure 7:
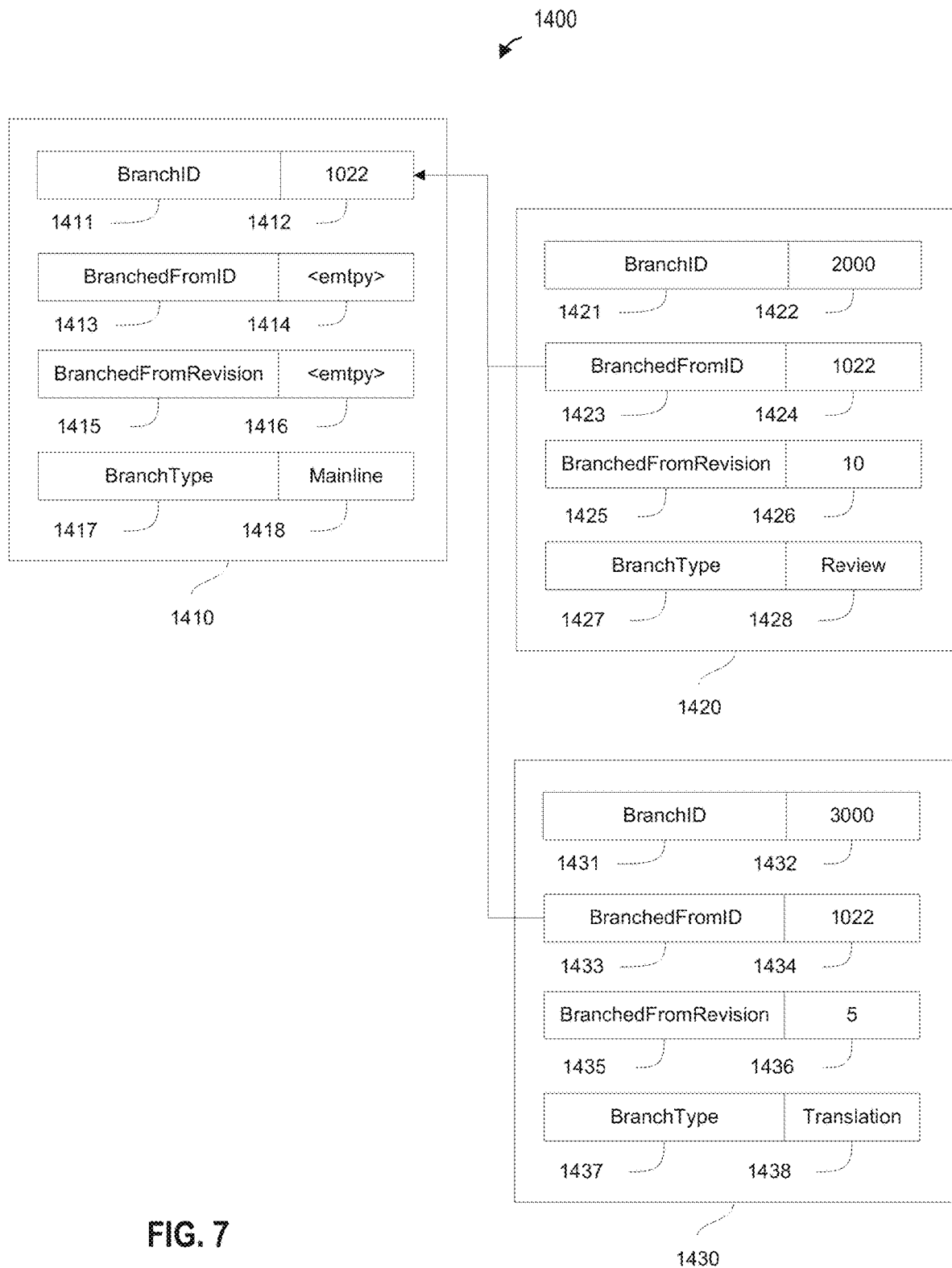
FIG. 7 is a data diagram of one example of a branch model, in accordance with certain embodiments of the present disclosure.

FIG. 7 is a data diagram of one example of a branch model 1400, in accordance with certain embodiments of the present disclosure. As illustrated, the branch model 1400 includes a primary branch 1410 and secondary branches 1420 and 1430. In some embodiments, each branch is represented by a data structure including a BranchID, a BranchedFromID, a BranchedFromRevision, and a BranchType. In one example, the primary branch 1410 includes a data structure of data fields 1411, 1413, 1415 and 1417, and data values 1412, 1414, 1416, and 1418. In one example, the primary branch 1410 is a mainline branch, such that the BranchType 148 has the value of "Mainline", the BranchedFromID 1414 has the value of "<empty>" and the BranchedFromRevision 1416 has the value of "<empty>".

The secondary branch 1420 includes a data structure of data fields 1421, 1423, 1425 and 1427, and data values 1422, 1424, 1426, and 1428. In this example, the secondary branch 1420 is a branch from the primary branch 1410, such that BranchedFromID 1424 has the value of "1022" being the BranchID of the primary branch 1410. The secondary branch 1420 is generated based on revision 10 as indicated by the BranchedFromRevision 1425 with a value 1426 of "10". The secondary branch 1420 is a review branch as indicated by the BranchType 1427 with a value 1428 of "Review".

The secondary branch 1430 includes a data structure of data fields 1431, 1433, 1435 and 1437, and data values 1432, 1434, 1436, and 1438. In this example, the secondary branch 1430 is a branch from the primary branch 1410, such that BranchedFromID 1434 has the value of "1022" being the BranchID of the primary branch 1410. The secondary branch 1420 is generated based on revision 5 as indicated by the BranchedFromRevision 1435 with a value 1436 of "5". The secondary branch 1430 is a translation branch as indicated by the BranchType 1437 with a value 1438 of "Translation".

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, solid state drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the disclosure (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method implemented by one or more processors, the method comprising:
    obtaining a first document associated with a primary document, the primary document in a primary language, the first document comprising one or more translated sections in a first language, the one or more translated sections being mapped to one or more sections in the primary document via a content identifier, the first language being different from the primary language;
    transmitting the first document to a first user for review;
    receiving a first input associated with the one or more translated sections in the first document from the first user, the first input comprising a content selection and a comment, the content selection including one or more characters selected from the one or more translated sections; and
    populating, by the one or more processors, the first input to a context section in the primary document based on the content identifier;
    wherein the context section includes a first number of characters in the primary language;
    wherein the content selection includes a second number of characters in the second language;

wherein the first number of characters is different from the second number of characters.

2. The method of claim 1, wherein the content identifier includes a hierarchical data structure.

3. The method of claim 1, wherein the content selection is a portion of a sentence in the first document, wherein the context section is a paragraph in the primary document.

4. The method of claim 1, wherein populating, by the one or more processors, the first input to the primary document comprises:
   determining, by the one or more processors, the context section in the primary document in the primary language based on the content identifier and the content selection including the one or more characters selected from the one or more translated sections in the first language by the first user; and
   associating, by the one or more processors, the comment with the context section.

5. The method of claim 1, wherein the content selection is associated with an anchor, wherein the anchor includes metadata associated with a paragraph in the first document, wherein the paragraph includes the content selection, wherein the context section is determined based on the content identifier and the anchor.

6. The method of claim 1, wherein the content selection is associated with an anchor, wherein the anchor includes metadata associated with a cell identifier in the first document, wherein the cell identifier is associated with a cell including the content selection, wherein the context section is determined based on the content identifier and the anchor.

7. The method of claim 1, further comprising:
   obtaining a second document associated with the primary document, the second document comprising one or more second translated sections in a second language, the one or more second translated sections being mapped to one or more second sections in the primary document via a second content identifier, the second language being different from the primary language, the second language being different from the first language; and
   transmitting the second document to a second user for review.

8. The method of claim 7, further comprising:
   transmitting the first input to the second user; and
   receiving a second input from the second user.

9. The method of claim 8, wherein transmitting the first input to the second user comprises:
   populating the first input to the second document based at least in part on the content identifier and the second content identifier.

10. The method of claim 8, wherein transmitting the first input to the second user comprises:
    receiving a review configuration associated with the second user; and
    transmitting the first input to the second user based at least in part on the review configuration.

11. The method of claim 1, wherein the content identifier includes a document identifier and a section identifier.

12. The method of claim 1, wherein the content selection includes an indication of selection, wherein the indication includes at least one selected from a group consisting of a highlight, an underline, and a box.

13. A system comprising:
    one or more memories storing instructions thereon; and
    one or more processors configured to execute the instructions to perform the operations comprising:
      obtaining a first document associated with a primary document, the primary document in a primary language, the first document comprising one or more translated sections in a first language, the one or more translated sections being mapped to one or more sections in the primary document via a content identifier, the first language being different from the primary language;
      transmitting the first document to a first user for review;
      receiving a first input associated with the one or more translated sections in the first document from the first user, wherein the first input comprises a content selection and a comment, wherein the content selection includes one or more characters selected from the one or more translated sections; and
      populating the first input to the primary document based on the content identifier;
    wherein the context section includes a first number of characters in the primary language;
    wherein the content selection includes a second number of characters in the second language;
    wherein the first number of characters is different from the second number of characters.

14. The system of claim 13, wherein the content identifier includes a hierarchical data structure.

15. The system of claim 13, wherein the content selection is a portion of a sentence in the first document, wherein the context section is a paragraph in the primary document.

16. The system of claim 13, wherein populating the first input to the primary document by at least:
    determining a context section in the primary document in the primary language based on the content identifier and the content selection including the one or more characters selected from the one or more translated sections in the first language by the first user; and
    associating the comment with the context section.

17. The system of claim 13, wherein the content selection is associated with an anchor, wherein the anchor includes metadata associated with a paragraph in the first document, wherein the paragraph includes the content selection, wherein the context section is determined based on the content identifier and the anchor.

18. The system of claim 13, wherein the content selection is associated with an anchor, wherein the anchor includes metadata associated with a cell identifier in the first document, wherein the cell identifier is associated with a cell including the content selection, wherein the context section is determined based on the content identifier and the anchor.

19. The system of claim 13, wherein the operations further comprise:
    obtaining a second document associated with the primary document, the second document comprising one or more second translated sections in a second language, the one or more second translated sections being mapped to one or more second sections in the primary document via a second content identifier, the second language being different from the primary language, the second language being different from the first language; and
    transmitting the second document to a second user for review.

20. The system of claim 19, wherein the operations further comprise:
    transmitting the first input to the second user; and
    receiving a second input from the second user.

21. The system of claim 20, wherein the operations further comprise:

populating the first input to the second document based at least in part on the content identifier and the second content identifier.

22. The system of claim 20, wherein the operations further comprise:
receiving a review configuration associated with the second user; and
transmitting the first input to the second user based at least in part on the review configuration.

23. The system of claim 13, wherein the content identifier includes a document identifier and a section identifier.

24. The system of claim 13, wherein the content selection includes an indication of selection, wherein the indication includes at least one selected from a group consisting of a highlight, an underline, and a box.

* * * * *